June 23, 1964    C. L. HAINES    3,138,324
TOTALIZER ENGAGING AND DISENGAGING MECHANISM
FOR ACCOUNTING MACHINES
Filed Feb. 14, 1963    4 Sheets-Sheet 2
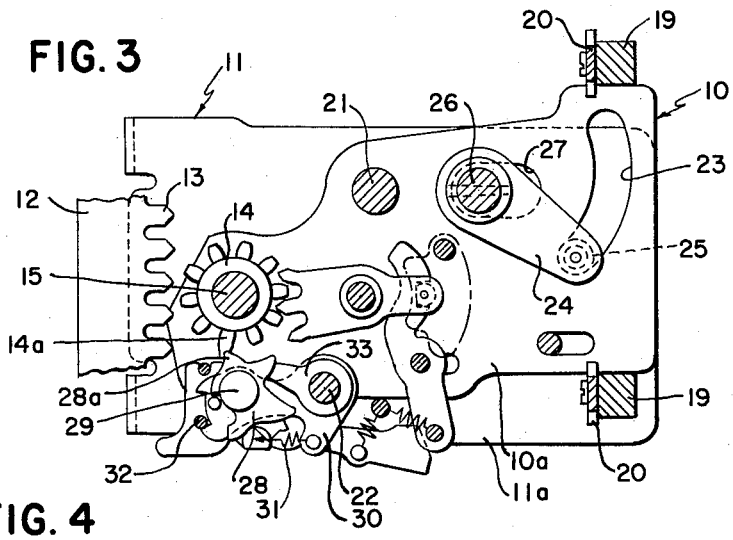
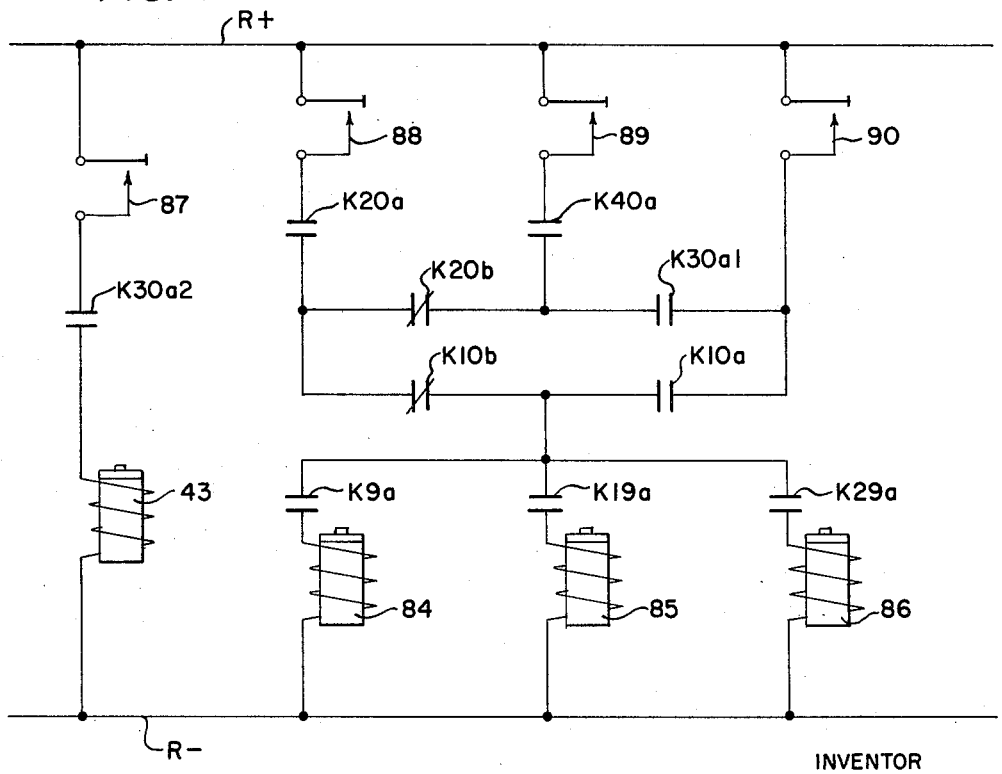
INVENTOR
CAREY L. HAINES
BY
HIS ATTORNEYS

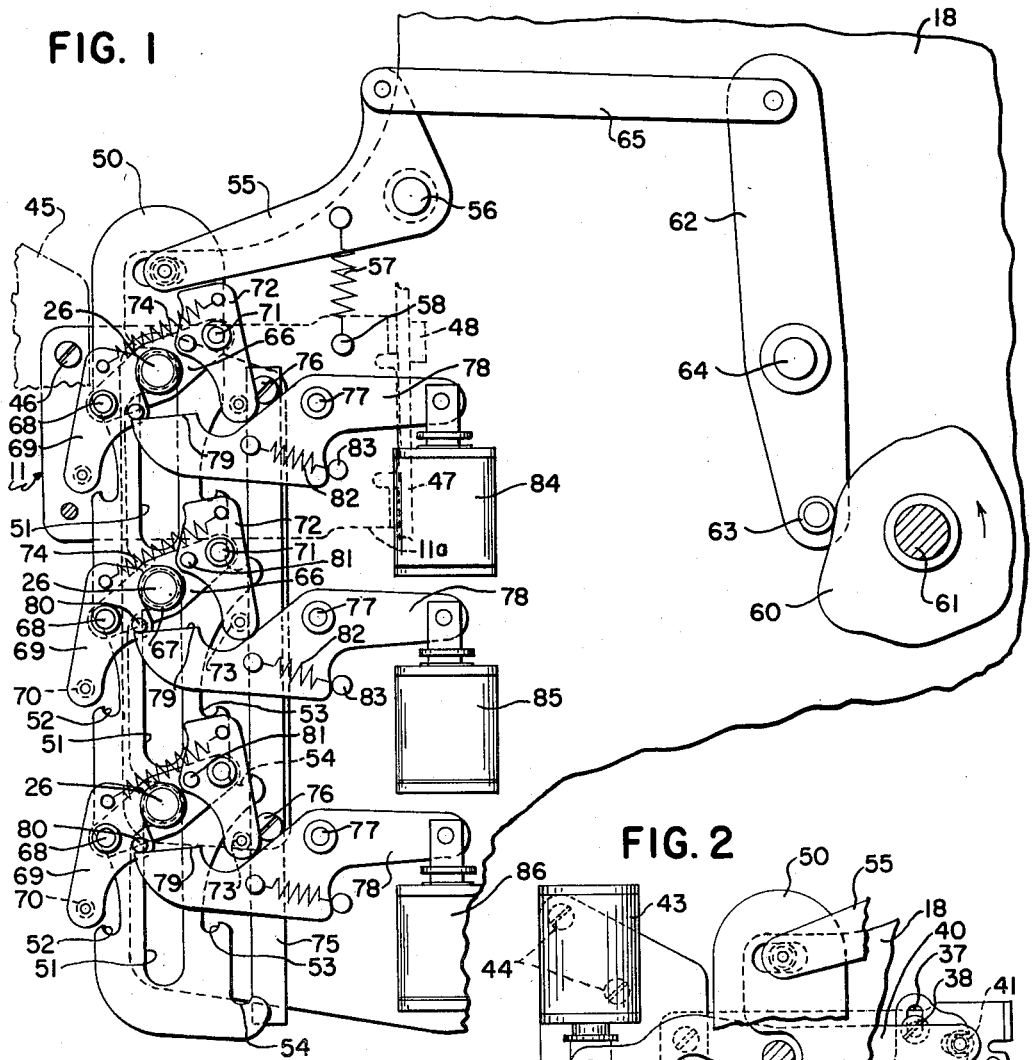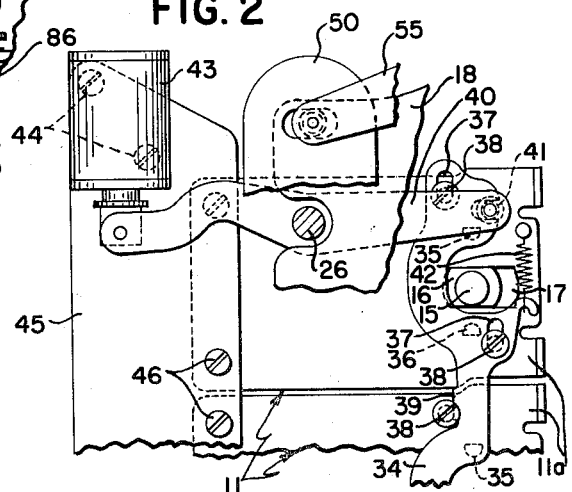

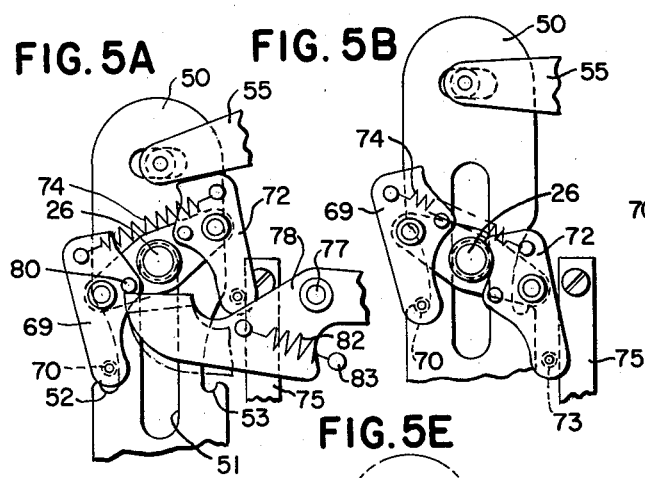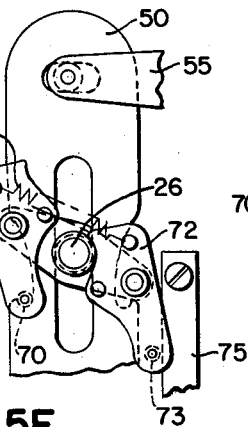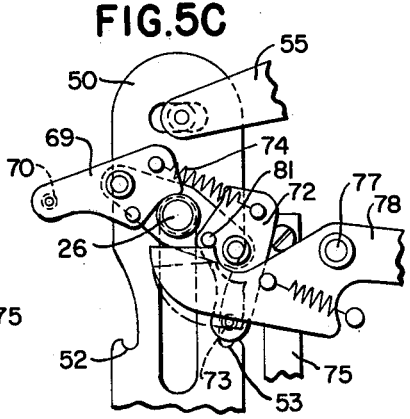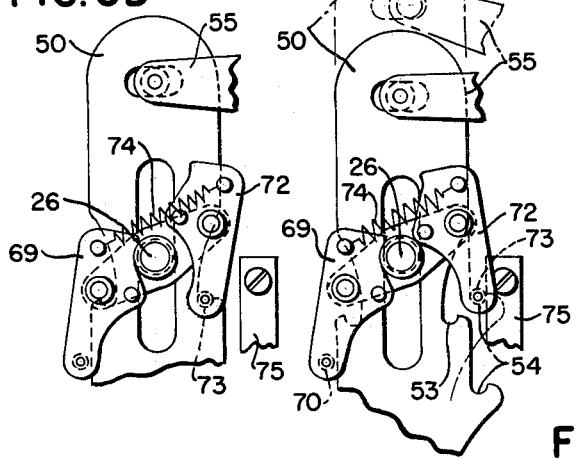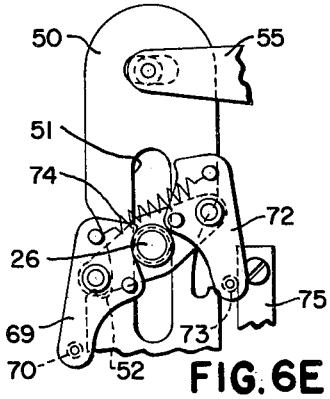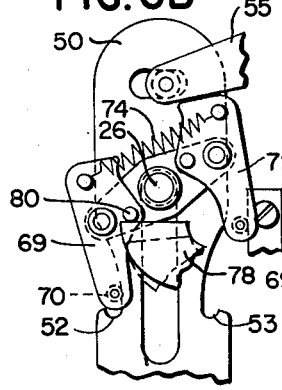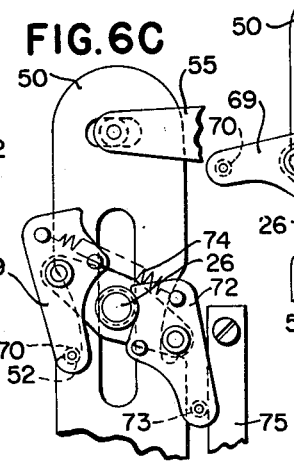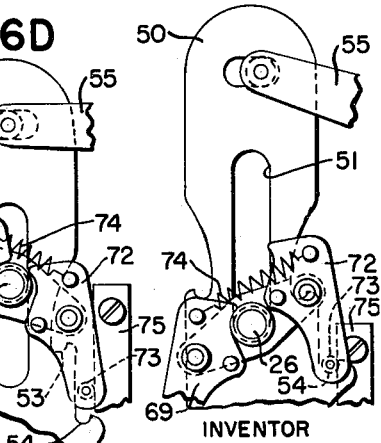

June 23, 1964
C. L. HAINES
3,138,324
TOTALIZER ENGAGING AND DISENGAGING MECHANISM
FOR ACCOUNTING MACHINES
Filed Feb. 14, 1963
4 Sheets-Sheet 4
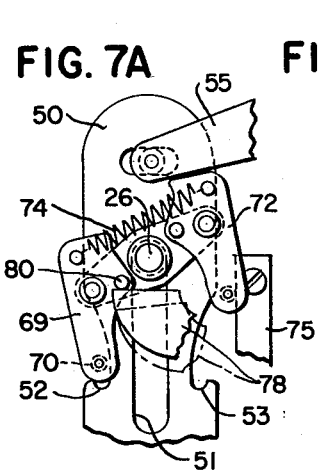
FIG. 7A
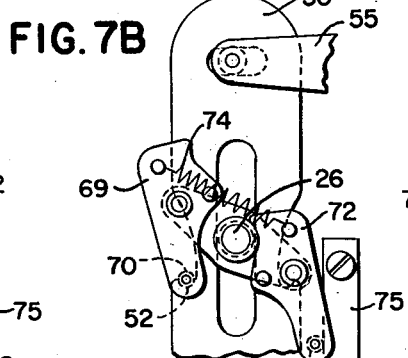
FIG. 7B
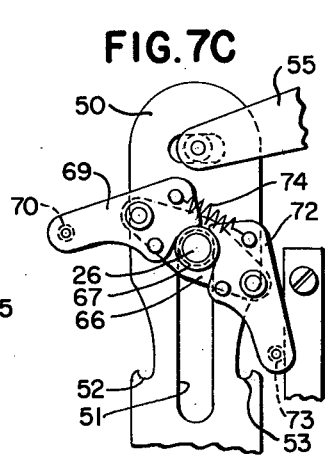
FIG. 7C
FIG. 7D
FIG. 7E
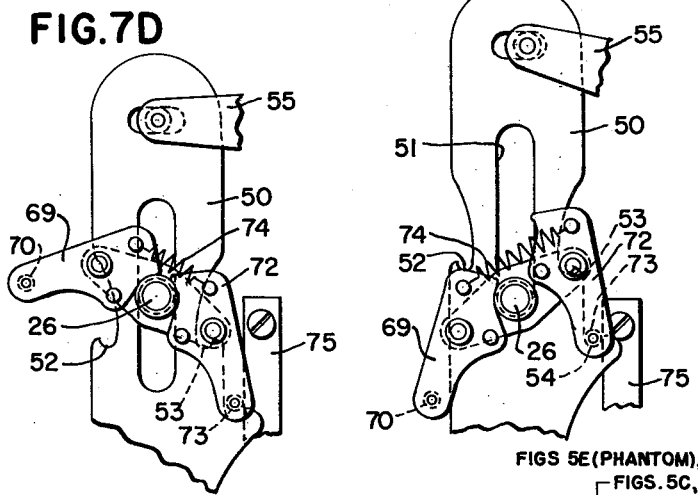
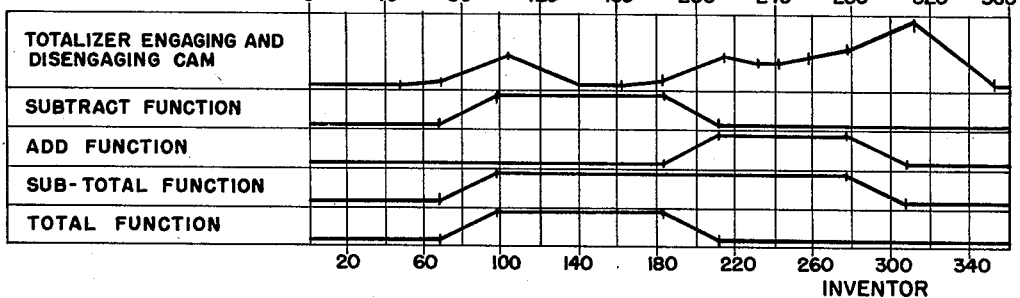
INVENTOR
CAREY L. HAINES
BY *Louis A. Kline*
*Wilbert Hawk, Jr.*
HIS ATTORNEYS

3,138,324
TOTALIZER ENGAGING AND DISENGAGING MECHANISM FOR ACCOUNTING MACHINES
Carey L. Haines, New Burlington, Ohio, assignor to The National Cash Register Company, Dayton, Ohio, a corporation of Maryland
Filed Feb. 14, 1963, Ser. No. 258,447
9 Claims. (Cl. 235—60)

The present invention is directed generally to improvements in the totalizer equipment employed in accounting and like machines. More specifically, such invention relates to an improved totalizer engaging and disengaging mechanism which, by way of selectivity in totalizer interconnection with a single type-of-operation control member regularly actuated throughout a plurality of movements during each accounting machine cycle of operation, enables any selected totalizer of the accounting machine to be operated for entering a digit amount additively thereto, to be operated for entering a digit amount subtractively thereto, to be operated for sub-totaling an accumulated amount contained therein, or to be operated for totaling-out an accumulated amount contained therein.

The precise accounting machine chosen as a suitable example to illustrate and describe the various features of the present invention is of the same general type as the central control unit disclosed in an application for Letters Patent of the United States, Serial No. 221,459, filed September 5, 1962, by Willard C. Rosener et al. Thus, as same is illustrated and described herein, the present invention may be deemed an improvement to the totalizer equipment employed in a bank proof type of machine—that is, as such equipment is contained within the accounting machine unit thereof. While this is true, it will become evident from a study of the following disclosure that the herein-presented invention may also be applied to other forms of accounting machines with equally desirable results, such as, for example, to those machines of the type fully disclosed in letters patent of the United States, No. 2,930,523, and in a co-pending application for letters patent of the United States, Serial No. 9,261, to and by Raymond A. Christian et al.

As understood from co-pending application Serial No. 221,459, the accounting machine herein chosen to disclose the present invention (being the central control unit of an overall bank proof machine) is provided with a plurality of totalizer lines, one spaced vertically above the other and all arranged so as to extend downwardly along the back of the machine. As known, one of the lines of totalizers is considered to be a "proof totalizer" and receives from differentially-settable actuator racks associated therewith each and every digit amount caused to be entered into the machine. As also known, the remaining lines of totalizers are considered to be "group totalizers" in that each contains a plurality of sets of interspersed totalizer wheels which are laterally shiftable in relation to the differentially-settable actuator racks so as to be selectively aligned therewith for receiving, under control of associated distribution control keys, individual ones of those digit amounts directed to the machine proof totalizer in each instance. Thus, selection of the machine proof totalizer is automatic during each machine cycle of operation for receiving all digit amounts being entered into the machine, whereas selection of a group totalizer therewith, via the shifting of a precise set of interspersed totalizer wheels, is under control of selectively depressable distribution control keys.

As further understood from such co-pending application by Rosener et al., both the machine proof totalizer line and each of the machine group totalizer lines are mounted for horizontal shifting movement to and from engagement with the associated actuator racks, being normally disengaged therefrom but being operable into engagement therewith at precise points in time and for precise periods of time during machine cycling. In the one instance, the precise timing (point in and period of cycling time) of totalizer engagement enables the associated actuator racks to enter an amount additively thereto. In another instance, the precise timing of totalizer engagement causes the associated actuator racks to read (sub-total) an accumulated amount contained therein. In still another instance, the precise timing of totalizer engagement either enables the associated actuator racks to enter an amount subtractively thereto or causes such racks to read-and-reset (total) an accumulated amount contained therein, all depending upon whether or not the totalizer wheels are permitted to be rotated beyond "zero" at such time. As set forth in the Rosener et al. application, Serial No. 221,459, and as will be included in the ensuing detailed description of the instant invention, the type of totalizer function performed (subtract or total) during the last-above-mentioned timing of totalizer engagement is under direct control of the usual transfer trip plate included in the construction of the totalizer mechanism—that is, whether such trip plate is permitted to remain in a normal "zeroizing" position where same stops totalizer operation when zeroization thereof is reached, or whether such trip plate is caused to be removed from normal where same permits totalizer operation to continue beyond zero. Of course, the precise timing of totalizer engagement with the associated actuator racks, as well as the positioning of the totalizer carried transfer trip plate thereduring, are those things coming under control of that portion of the machine construction usually designated as the totalizer engaging and disengaging mechanism.

While the precise totalizer engaging and disengaging mechanism disclosed in application Serial No. 221,459 operates very satisfactorily, same is considered to be somewhat bulky and cumbersome in that, for each totalizer line included in the machine construction, there is necessarily provided a nest of three engagement control solenoids and one transfer trip plate control solenoid; each engagement control solenoid being arranged so as to cause interconnected mechanism to be either engaged with or disengaged from a corresponding type-of-operation control slide regularly actuated during each machine cycle of operation, and such trip plate control solenoid being arranged so as to cause interconnected mechanism to remove the transfer trip plate from its normal "zeroizing" position during those machine operations in which a digit amount is directed for subtract entry to the selected totalizer. This assemblage of parts, as has been described in detail in the reference application, provides an overall totalizer engaging and disengaging mechanism having a separate subtract and total type-of-operation control slide regularly actuated during each machine cycle of operation, having a separate add type-of-operation control slide regularly actuated during each machine cycle of operation, having a separate sub-total type-of-operation control slide regularly actuated during each machine cycle of operation, having a separate subtract and total engagement control solenoid associated with each totalizer line, having a separate add engagement control solenoid associated with each totalizer line, having a separate sub-total engagement control solenoid associated with each totalizer line, and having a separate trip plate control solenoid associated with each totalizer line. Furthermore, there is necessarily provided precise mechanism under control of each of such engagement control solenoids for causing the selected totalizer line to be engaged with the associated actuator racks at and for that specified cycling time defined by regular actuation of a particular one of the type-of-operation control slides.

Contrary to this plural engagement control solenoid and like plural type-of-operation control slide requirement for performing each of the add, subtract, total, and sub-total machine functions, the present invention sets forth an overall mechanism adapted to perform each of such machine functions through use of but a single type-of-operation control slide regularly actuated during each machine cycle of operation, through use of but a single engagement control solenoid being provided for each totalizer line included in the machine construction, and through use of but a single trip plate control solenoid being provided for all of such totalizer lines. This, when considering any one totalizer line, is the elimination of two type-of-operation control slides and the elimination of the two engagement control solenoids. Of course, as will be understood from ensuing description of the instant invention, such elimination of slides and solenoids requires a revision in the operational procedure followed for totalizer engagement; being essentially, as directed by the operation of a precisely developed selection means selectively actuated under control of the single engagement control solenoid, a timed interconnection between the totalizer line and the single type-of-operation control slide during the period of time that same is being regularly actuated during machine operation. Contrary to the teaching of the Rosener et al. application, a totalizer engagement operation may now be initiated while the operation of the single control slide is in progress—that is, have the selected totalizer actually interconnected with such slide while on the fly so to speak, rather than, as has been previously taught, initiated before, and only before, any movement of such a control slide is caused to take place.

With the above discussion in mind, it is clear that the sole object of the instant invention lies in the provision of a totalizer engaging and disengaging mechanism of extreme simplification, both in construction and operation.

With this and incidental objects in view, the invention includes certain novel features of construction and combinations of parts, a preferred form or embodiment of which is hereinafter described with reference to the drawings which accompany and form a part of this specification.

In the drawings:

FIG. 1 is a left side elevational view of the instant invention as applied to a plurality of horizontally shiftable and vertically spaced apart totalizer lines;

FIG. 2 is a left side elevational view of transfer trip plate control mechanism included in the instant invention;

FIG. 3 is a detailed right end sectional view of a typical totalizer line as arranged with a fragmentary portion of an associated actuator or setting rack;

FIG. 4 is a wiring diagram showing specific circuit means for engaging any one of the totalizer lines of FIG. 1 with the associated actuator racks at add timing, at subtract and total timing, and at sub-total timing;

FIGS. 5A, 5B, 5C, 5D and 5E are fragmentary detail views showing the order of operation of the instant invention for performing totalizer engagement at a subtract and total timing during machine operation;

FIGS. 6A, 6B, 6C, 6D and 6E are fragmentary detail views showing the order of operation of the instant invention for performing totalizer engagement at an add timing during machine operation;

FIGS. 7A, 7B, 7C, 7D and 7E are fragmentary detail views showing the order of operation of the instant invention for performing totalizer engagement at a sub-total timing during machine operation; and FIG. 8 is a time chart combining in graphic form an illustration of the regular actuation of the single type-of-operation control slide of the instant invention during each machine cycle of operation along with an illustration of the required timing of totalizer engagement and disengagement with the associated actuator racks thereduring for performing subtract, add, sub-total, and total machine functions.

GENERAL TOTALIZER ARRANGEMENT MECHANISM, AND MODE OF OPERATION

As explained previously, all of the totalizer equipment herein illustrated, with the exception of the improved engaging and disengaging mechanism therefor, is fully disclosed in the application for United States letters patent, Serial No. 221,459, by Rosener et al. Since reference may be had to such co-pending application for a more complete description of this equipment, only those features thereof which are pertinent to the instant invention will be described herein, and then only in a general way.

As shown in FIG. 1, the accounting machine chosen to illustrate the present invention has been restricted to three lines of totalizers, this being done solely for the sake of convenience in description. Such lines are designated herein as an upper totalizer line, an intermediate totalizer line, and a lower totalizer line, and each is located at the rear of the machine and is maintained in vertical alignment, one over the other in a regular order. As known, one of such totalizer lines may be of the crossfooter type while the remaining ones of such lines may be of the interspersed type. While the precise makeup of the totalizer lines employed is extremely important to the overall use and flexibility of any accounting machine, such is not taken in consideration in the disclosure of the instant invention—this being due to the fact that, when relating same to an associated engaging and disengaging mechanism, both of such types of totalizers (crossfooter and interspersed) are provided with essential elements substantially identical in construction. That is, while a different arrangement of totalizer wheels is provided along each of such several types of totalizer lines, which requires variations in the amount of axial shifting thereof for aligning precise sets of wheels with the associated actuator racks, the horizontal shifting of each of such types of totalizer lines, to and from wheel and actuator rack engagement, is performed in a common fashion under direct control of that totalizer engaging and disengaging mechanism employed therewith. In each instance, as can be understood from FIG. 3, the totalizer wheels caused to be aligned with the associated actuator racks are normally maintained out of engagement therewith, and, when so directed by the associated engaging and disengaging mechanism, are caused to be shifted into engagement therewith at and for a precise time during machine operation for either entering amounts thereto or removing amounts therefrom.

Each of the totalizer lines herein employed for disclosing the present invention is supported in a shiftable framework 10 (FIG. 3) which is mounted for fore-and-aft (horizontal) shifting movement within a stationary framework 11 (see also FIG. 1) to engage and disengage the totalizer wheels thereof with and from the actuator racks associated therewith. The actuator racks themselves, designated by the numeral 12 in FIG. 3, are of that overall number conforming to the capacity of the accounting machine carrying same, and are each mounted for vertical shifting movement during each machine cycle of operation. Gear teeth 13 (FIG. 3) formed on the rear edge of each actuator rack 12 are arranged to be engaged with similar teeth formed on a like-in-order totalizer wheel or pinion 14, which wheel 14, in each instance, is rotatably mounted on a horizontally disposed shaft 15 extending across the totalizer shiftable framework 10. As known, such shiftable framework 10 is mounted for shifting movement within the associated stationary framework 11 to engage and disengage the totalizer wheels 14 and the actuator racks 12 in proper timing for performing a precise type of machine operation. Although not shown in any amount of detail herein, the totalizer shiftable framework 10 is made up of similar right and left frame plates 10a (FIG. 3), between which extends the totalizer wheel 14 carrying shaft 15. The totalizer stationary framework 11 comprises like right and left frame plates 11a (FIGS. 1 and 3), which are secured to an appropriate casting member 47 mounted to the rear sides of support bars 48 (one only shown) extending between right and left side plates 18 of the machine general framework construction. As understood from FIG. 3, the rear ends of the totalizer shiftable framework right and left frame plates 10a have finished outer edges which slide between opposing faces of square spacing bars 19 supported by the totalizer stationary framework 11, and said frame plates 10a are maintained in proper side-spaced relationship to each other by slots formed in combs 20 secured to the front surfaces of the spacing bars 19 engaging the finished outer edges thereof. In that manner fully illustrated and described in the copending reference application, Serial No. 221,459, the shiftable framework carried shaft 15, which supports rotatably the various totalizer wheels or pinions 14, is received freely within an appropriate bushing 16 adapted to slidingly engage horizontal slots 17 formed in each of the frame plates 11a of the totalizer stationary framework 11. This provides, as can be understood from FIG. 2, a front guide means for the totalizer shiftable framework 10 at all times. In the usual manner, the right and left frame plates 10a of the totalizer shiftable framework 10 support a totalizer aligner shaft 21 and a transfer pawl shifting shaft 22 (FIG. 3), which shafts move fore-and-aft with the totalizer framework 10 in order to maintain the parts which they carry in proper relationship with the totalizer wheels 14 at all times.

The actual shifting of the totalizer framework 10, for the purpose of engaging and disengaging the selected totalizer wheels 14 and their associated actuator racks 12, is performed by means of cam slots 23 provided in each of its frame plates 10a (one of which slots 23 is illustrated in FIG. 3 with relation to the right frame plate 10a of such shiftable framework 10) being engaged by rollers 25 carried by crank arms 24 secured to an engaging and disengaging shaft 26 (see also FIG. 1) journaled in the frame plates 11a of the totalizer stationary framework 11. With this overall arrangement, any counter-clockwise (FIG. 3) and clockwise (FIG. 1) rocking of the engaging and disengaging shaft 26, through shifting of rollers 25 along the cam slots 23 thereby, will move the framework 10 carried totalizer wheels 14 forwardly and toward engagement with the associated actuator racks 12—that is, from the normal non-meshing relationship therebetween (FIG. 3) to a meshing relationship therebetween (not herein shown). Of course, a reverse rocking of such shaft 26, back to its normal position (FIG. 3), will effectively restore such wheels 14 to their normal, non-meshing relationship with respect to the racks 12. As usual, and as illustrated herein in FIG. 3, an appropriate clearance slot 27 is provided in each of the frame plates 10a for receipt of the engaging and disengaging shaft 26, so that the totalizer shiftable framework 10 may be moved independently of said shaft 26. As the above discussion makes clear, it is the specific mechanism employed for operating the engaging and disengaging shaft 26, to effect engagement and disengagement of the totalizer wheels 14 and the actuator racks 12 in proper timing for the type of machine operation being performed, that is the gist of the present invention. Through such mechanism, totalizer operation may be selectively initiated during each machine cycle of operation for performing either an add, a subtract, a sub-total, or a total type of machine function.

As has been taught in co-pending application Serial No. 221,459, each of the totalizer actuator racks 12 is caused to be shifted first downwardly and then returned upwardly, to home, during each machine cycle of operation—the extent of downward movement of such rack being, in the one instance, determined by the differential setting thereof under control of an associated amount entry key previously depressed, and being, in another instance, determined by the previous setting of the particular totalizer pinion or wheel 14 associated therewith. For the purposes hereof, the timing of such rack movement may presently be stated generally as being downwardly prior to mid-cycle of each machine operation and upwardly shortly after mid-cycle of each machine operation. The precise timing (in degrees) of such rack movement will be included with later operational description of the instant invention.

When considering an adding type of machine operation, it is after each of such actuator racks 12 has completed its overall downward movement, being thus differentially positioned in accordance with the value of a depressed amount key, that forward movement is imparted to the shiftable framework 10 to engage the corresponding totalizer wheel 14 therewith prior to its upward return movement—thus enabling such rack upward movement to advance said wheel in an additive (clockwise, FIG. 3) direction so as to enter therein the overall digit value of the depressed amount key. Of course, after the actuator racks 12 have completed their upward return movement, rearward disengaging movement is imparted to the framework 10 to disengage the corresponding totalizer wheels 14 from the teeth 13 thereof. As mentioned previously with respect to FIG. 3, the imparting of a forward shifting movement to the totalizer framework 10 will take place whenever the engaging and disengaging shaft 26 is caused to be rocked counter-clockwise. This would be clockwise rocking of such shaft 26 when viewing FIG. 1. In either instance, the return to normal of such shaft 26, clockwise in FIG. 3 and counter-clockwise in FIG. 1, returns the framework 10 rearwardly to its normal, totalizer non-engaging position, as shown. That is, in view of the prescribed construction of the totalizer mechanism herein employed, rocking of the engaging and disengaging shaft 26 thereof from its normal position causes, through the crank arm 24 and cam slot 23 arrangement, the totalizer shiftable framework 10 to be moved forwardly that extent which presents those totalizer wheels 14 selectively aligned with the actuator racks 12 in mesh therewith, whereas return to normal of such shaft 26 pulls the wheels 14 out of such a rack meshing relationship.

When considering both total and sub-total machine operations, forward movement of the totalizer shiftable framework 10 is caused to be had prior to initial downward movement of the actuator racks 12, hence engaging immediately those wheels 14 previously aligned therewith. This permits downward movement of the actuator racks 12 to rotate such totalizer wheels 14 in a reverse-from-additive (counter-clockwise, FIG. 3) direction until such rotation is stopped by the normally provided long tooth 14a on each of said wheels 14 coming into contact with the above-referred-to trip plate of the usual tens transfer mechanism, which mechanism will be explained more in detail later herein, to zeroize such wheels 14 and to position the associated actuator racks 12 in accordance therewith. Hence, while the totalizer wheels 14 are actually set by the differential stopping of the associated actuator racks 12 during adding types of machine operations, the actuator racks 12 are caused to be set by the stopping at zero of the totalizer wheels 14 during both total and sub-total types of machine operations. Essentially, rather than having the actuator racks 12 set the wheels 14, the wheels 14 now set the racks 12. In total operations, the totalizer shiftable framework 10 receives its rearward (to home) movement prior to the return movement upwardly of the actuator racks 12, and consequently, the totalizer wheels 14 thereof, in being so moved out of mesh therewith, remain in their zeroized condition. In sub-total operations, such wheels 14 remain in mesh with the actuator racks 12 during their return movement upwardly, and consequently, are thereby caused to be restored to their original, amount-contained, condition. In this latter instance, after the actuator racks 12 have completed their upward movement, rearward movement is imparted to the framework 10 so as to then disengage the wheels 14 from such racks 12.

In subtract machine operations, as was just stated for both total and sub-total machine operations, the totalizer shiftable framework 10 likewise receives forward movement to engage the wheels 14 with the actuator racks 12 prior to initial downward movement thereof. A reverse (counter-clockwise, FIG. 3) direction of rotation to such wheels 14 is thus again had as the racks 12 are moved downwardly, so as to subtract from each of said wheels 14 the value of a depressed digit key which, in the well known manner, controls the differential setting and causes downward movement of each actuator rack 12 to be terminated after a precise extent of travel has been completed. After the actuator racks 12 have completed such permitted movement downwardly, in turn rotating the meshing wheels 14 a precise amount counter-clockwise thereduring, rearward movement is imparted to the totalizer shiftable framework 10 to disengage such wheels 14 from the racks 12 prior to the time that same are returned upwardly to their starting positions. This overall timing of totalizer engagement and disengagement for subtract machine operations, it is seen, is identical to that set out above for total machine operations. This being true, it is clear that something more must be done during each subtracting operation so as to distinguish same from a total operation—that is, to permit each totalizer wheel 14 to now be rotated beyond zero if the differential setting of the associated actuator rack 12 so directs. Stated another way, the previously-described stopping of each totalizer wheel 14 at zero, by means of its long tooth 14a then coming into contact with the trip plate of the usual tens transfer mechanism, must be overcome during subtract machine operations. Unless there is freedom of totalizer wheel 14 movement beyond zero, it is axiomatic that any attempted entry of a digit amount subtractively thereto will result in a proper setting of only those wheels 14 which are directed to receive digits not requiring same to be rotated beyond zero.

As known from reference application Serial No. 221,459, the precise totalizer construction herein employed is provided with internal mechanism pre-conditional to one of two positions—either to a normal position which causes the transfer trip plate thereof, designated by the numeral 28 (FIG. 3), to stop at zero the associated order totalizer wheel 14 whenever same is rotated reversely (counter-clockwise, FIG. 3) during a machine operation, or to an off-normal position which causes such transfer trip plate 28 to permit beyond-zero movement of the associated order totalizer wheel 14 whenever same is rotated reversely during a machine operation. Without attempting to go into any great amount of detail herein, the transfer trip plate 28, as illustrated in FIG. 3, is pivotally supported on a stud 29 carried by a transfer trip arm 30 rotatably mounted on the above-mentioned transfer pawl shifting shaft 22. A spring 31 yieldingly urges such arm 30 clockwise to normally maintain the lower edge or wall of a notch formed in the forwardmost end thereof in yielding engagement with a fixed stop stud 32. This, as shown, presents an upper tooth 28a of the trip plate 28 in a position to co-act with the long tooth 14a of the totalizer wheel 14, which long tooth 14a, as usual, is located in the zero position of such wheel 14. An upper, rear edge of the trip plate 28 co-acts with the forward end of a latch finger 33 secured on the transfer pawl shifting shaft 22. As included in FIG. 3, such finger 33 is shown in its plus, or add, position, in which position it retains the trip plate 28 in a counter-clockwise rocked position where the upper tooth 28a thereof is in proper position for both tripping the transfer mechanism in add type of machine operations and stopping the associated totalizer wheel 14 at zero in both total and sub-total machine operations. That is, as prescribed by the illustrated positioning of the latch finger 33, the trip plate 28 is normally blocked against clockwise rocking movement and hence is maintained effective for preventing the totalizer wheel 14 from traveling beyond zero during a reverse-from-add (counter-clockwise) direction of rotation. Of course, an add direction of rotation of such totalizer wheel 14 (clockwise) is permitted at this time since the long tooth 14a thereof, when coming into contact with the trip plate tooth 28a, will overcome the spring 31 and rock the trip arm 30 (on which the trip plate 28 is carried) a precise extent counter-clockwise. With this happening the long tooth 14a is free to travel beyond zero in the additive direction.

To enable the long tooth 14a to likewise travel beyond zero in a subtractive (counter-clockwise) direction, it is clear that the latch finger 33 must be removed from behind the upper, rear edge of the trip plate 28 so that such plate, when the upper tooth 28a thereof is contacted by the long tooth 14a, may not place any restrictions on the extent of totalizer wheel movement. In recalling the Rosener et al. teaching, this was provided for through energization of the above-mentioned tens transfer solenoid (included in the nest of four solenoids for each totalizer line) whenever the associated totalizer line was caused to be selected for a subtract operation. This is likewise true for the present invention, with the exception that the heretofore-known plurality of tens transfer solenoids (one being provided for each totalizer line) is now replaced by a single tens transfer solenoid capable of handling each and every totalizer line provided in the machine construction. Hence, all internal mechanism contained in each totalizer line and caused to be actuated by a tens transfer solenoid, as admirably defined both in structure and operation in the Rosener et al. application, is likewise included in each totalizer line herein employed—the only difference being that all of such mechanisms are presently operated simultaneously under control of a single tens transfer solenoid rather than being operated individually under control of a specifically designated tens transfer solenoid associated therewith. For this reason, the precise details of such mechanism will not be duplicated herein, other than for that portion thereof which is necessary to complete the disclosure of the present invention.

Although not illustrated herein, the transfer pawl shifting shaft 22, in addition to carrying the latch finger 33 (FIG. 3) also has secured thereon the usual control arm member which, by means of a stud, engages a lower bifurcated end portion of a rocker arm (also not illustrated) rotatably supported on the totalizer wheel shaft 15 (see parts 1039, 1040 and 1041 in FIG. 66 of reference application Serial No. 221,459). As usual, forward extensions of such rocker arm cooperate, respectively, with spaced-apart studs carried by an associated slide member mounted for vertical shifting movement. While a single slide member is normally associated with each totalizer line included in the machine construction (as understood from part 1044 contained in FIG. 65 of the Rosener et al. application), the precise development of such a slide member for use herein combines all of the previous individual slide members into one element 34 (FIG. 2) adapted with a plurality of spaced-apart studs 35 and 36 associated with each totalizer line provided. That is, although not completely illustrated in FIG. 2, the present slide member 34 has three sets of studs 35 and 36 thereon, one for each of the three totalizer lines included herein for descriptive purposes. Hence, the length of the slide member 34 is determined by the overall number of totalizer lines provided in each instance. As can be understood from FIG. 2, the mounting of such slide member 34 is both through spaced-apart slots 37 therein engaging over guide studs or screws 38 carried by the left frame plate 11a of the uppermost totalizer line stationary framework 11, and by side edge guide surfaces 39 therealong (one only shown in FIG. 2) abutting further guide studs or screws 38 carried by the left frame plate 11a of each totalizer line stationary framework 11 therebelow. As shown, an upper bifurcated edge portion of such slide member 34 receives a stud 41 therewithin, which stud 41 is carried by the forward end portion of an actuating lever 40 rockably mounted on the engaging and disengaging shaft 26 of the uppermost totalizer line being provided. A spring 42 normally urges the slide member 34 upwardly, in turn presenting each of the pairs of studs 35 and 36 thereon in what may be called an add or plus position— where same are effective, through control over the shaft 15 carried rocker arm associated therewith, for maintaining (as so illustrated in FIG. 3) the latch finger 33 in blocking position relative to the transfer trip plate 28. This, as known, prevents counter-clockwise rotation of the totalizer wheels 14 (for any selected totalizer line) to go beyond zero.

The rear end portion of the actuating lever 40 (FIG. 2) is pivotally connected to the downwardly extending core member of a tens transfer solenoid 43—such solenoid being provided for selectively overcoming the normal urgency of the spring 42 so as to cause the slide member 34 to be shifted from its normal, add or plus position, downwardly to what may be called its subtract or minus position. When such is done—that is, upon energization of solenoid 43, each pair of studs 35 and 36 on the slide member 34 becomes effective for, through new control over the operation of the rocker arm associated therewith during forward movement of the totalizer shiftable framework 10 (i.e. for actuator rack 12 and totalizer wheel 14 engagement), causing the transfer pawl shifting shaft 22 to be rocked a precise distance counter-clockwise (FIG. 3). Counter-clockwise movement of the shaft 22, and hence the latch finger 33 thereon, causes said finger 33, in cooperation with a lower rear surface of the transfer trip plate 28, to rock said plate 28 clockwise from the position illustrated in FIG. 3 to a position in which the upper tooth 28a thereof permits a counter-clockwise or reverse rotation of the totalizer wheel 14 to be had beyond zero. As known, it is this freeing of the totalizer wheels 14 for beyond zero rotation in a reverse direction that distinguishes a subtract machine operation from a total machine operation, since the timing of engagement and disengagement by such totalizer wheels with the associated actuator racks 12 is the same in each instance. Thus, energization of the tens transfer solenoid 43 prior to totalizer engagement at the subtract and total timing during machine operation permits the initial downward movement of the actuator racks 12 to enter an amount subtractively to the totalizer wheels 14, whereas non-energization of such solenoid 43 at such time restricts the initial downward movement of the actuator racks 12 to returning the totalizer wheels 14 to a zeroized condition.

Mounting of the tens transfer solenoid 43 is by means of screws 44 interconnecting same to the upper end portion of a machine auxiliary left side plate 45 secured to and extending rearwardly from the left frame plate 11a of each totalizer line stationary framework 11 included in the machine construction. That is, the length of such plate 45 is such that same may be interconnected, by means of screws 46 and the like, to each of the three totalizer frameworks 11 provided herein. While a side-spacing view showing the relationship between such auxiliary side plate 45 and the earlier-mentioned machine left side plate 18 is not herein provided, it is clear from FIG. 2 that such plate 45 is positioned somewhat inwardly from the plate 18, and consequently has none of those elements associated therewith (such as the solenoid 43, the actuating lever 40, and the slide member 34) in any position to interfere with the now-described elements going to make up the present invention.

IMPROVED TOTALIZER ENGAGING AND DISENGAGING MECHANISM

As mentioned previously in the specification, the sole function to be performed by a totalizer engaging and disengaging mechanism with respect to each of the totalizer lines included in the present machine construction is that of selectively shifting, in a fore-and-aft direction, its totalizer wheels 14 into and out of engagement with the corresponding actuator racks 12. As included herein, such a mechanism is located in the overall machine makeup to lie immediately beside each of the totalizer lines provided, on the outer side of the machine framework left side plate 18 (FIG. 1). Before proceeding with the structural details of the specific engaging and disengaging mechanism herein disclosed, it should be recalled that the totalizer wheels 14 of the various lines provided, in each instance, are first engaged with the associated actuator racks 12 at a specific time during each machine cycle, and are then disengaged from such racks 12 at a specific cycle time thereafter, all in accordance with the particular type of machine operation being performed. In one instance, such engagement may take place after the actuator racks 12 have completed their downward shifting movement, thus enabling a digit amount to be entered additively into selected wheels 14 as such racks 12 are returned upwardly to their normal positions. This timing of engagement, as described earlier, causes the totalizer wheels 14 aligned with the actuator racks 12 to be rotated clockwise thereby an amount corresponding to a differential setting of such racks 12 under control of selectively depressed amount entering keys. In another instance, such engagement takes place prior to the time that the actuator racks 12 are shifted downwardly from their normal positions, thus causing the totalizer wheels 14 aligned therewith to be rotated counter-clockwise thereby for entering subtractively an amount key designated digit amount therein, if such is the case, or reading the accumulated amount contained therein under total-taking types of machine operations (both total and sub-total). If disengagement of the selected totalizer wheels 14 from the actuator racks 12 takes place prior to the return to normal of such actuator racks 12—that is, after such racks 12 have been shifted downwardly but prior to their return movement upwardly, it is apparent that either a subtract type of machine operation or a total type of machine operation may be performed, depending upon whether or not the totalizer lines have been pre-conditioned for a subtract type of function through a previous energization of the tens transfer solenoid 43, all in the manner described hereinabove. Of course, energization of such solenoid 43 will be directed whenever, as set up on the machine carried digit amount keys, a specific amount is desired to be entered subtractively into a selected one or more of the totalizers. Since the timing of engagement and disengagement of the totalizer wheels with the actuator racks is identical for performing both the subtract and total functions, non-energization of such solenoid 43 would, through the totalizer lines being not thereby directed otherwise, enable any accumulated amount already contained in the totalizers (the selected one thereof) to be read therefrom as the wheels 14 are rotated to a zero setting by the racks 12. The precise manner herein employed for controlling the operation of such tens transfer solenoid 43 will be described in detail later in the specification with respect to FIG. 4. A further totalizer function which may be performed by the timing of engagement and disengagement of the totalizer wheels 14 with the actuator racks 12 is that of a sub-total type of machine operation, where the timing of engagement is identical to that of a subtract or total type of machine operation, but the timing of disengagement is postponed until the actuator racks have returned upwardly to their normal positions. This engaging and disengaging timing enables the selected totalizer wheels to be returned to zero as the accumulated amount contained therein is read during the downward shifting movement of the actuator racks, and then returned again to their starting (amount containing) positions during the upward return movement of such racks.

As illustrated in FIG. 1, a single type-of-operation control member 50, hereinafter referred to specifically as a totalizer engagement drive link 50, is slidingly supported for vertical movement along the outer surface of the machine framework left side plate 18. The precise mounting of such link 50 is by means of spaced-apart, longitudinal slots 51 thereof engaging over the left end portion of each totalizer engaging and disengaging shaft 26 provided in the machine construction. Thus, the overall length of the totalizer engagement drive link 50 is, like the above slide member 34, again determined by the number of totalizer lines included in the machine makeup, which is, for the sake of convenience in this disclosure, three in number. As further illustrated in FIG. 1, the upper end portion of such drive link 50 is pivotally connected to a drive arm 55 rotatably carried by a stud 56 extending outwardly from the machine left side plate 18. By means of a spring 57, stretched between such arm 55 and a further stud 58 in the side plate 18, a counter-clockwise rocking movement is continually imparted to the arm 55 to, in turn, yieldingly maintain the interconnected drive link 50 in that position where each of the slots 51 thereof has its upper end maintained in abutment with the associated shaft 26. This is the normal, spring-urged positioning of such link 50, as same is so illustrated in FIG. 1.

As still further illustrated in FIG. 1, a totalizer engaging and disengaging cam 60 is secured to a machine cam shaft 61 journaled within the overall machine framework, such cam 60 being likewise located on the outer side of such framework left side plate 18. As is known from the Rosener et al. teaching, this cam shaft 61 (which is the main cam shaft of the machine) is rotated counter-clockwise through a single cycle of movement for each machine operation caused to be initiated. Abutting the periphery of the totalizer engaging and disengaging cam 60 is a roller 63 carried by a cam arm 62 rotatably mounted on the usual cam arm shaft 64 of the herein-selected machine, which shaft 64 is likewise supported by the overall machine framework. By means of an interconnecting link 65, extending between the drive arm 55 and the cam arm 62, each and every movement imparted to the cam arm 62 by rotation of the cam 60 is, through controlled actuation of the drive arm 55 thereby, transferred into precise extents of upward shifting movement being imparted to the totalizer engagement drive link 50. Since the spring 57, in being effective for continually urging such link 50 downwardly, is likewise effective for maintaining the roller 63 in constant contact with the periphery of the cam 60, the overall development of such cam 60, although same is in the form of a single plate cam, will prescribe a precise upward and downward shifting operation to be had by the link 50 during each cycle of rotational movement completed by the machine main cam shaft 61. Speaking generally, link 50 movement during each machine cycle of operation, as can be understood from line one of FIG. 8, is divided into three separate stages, the first of which is completed when the timing of operation of the totalizer engaging and disengaging cam 60 causes the link 50 to reach a first elevation from home and then be returned to home, the second of which is completed when the timing of such cam 60 causes the link 50 to reach a second (like the first) elevation from home and then be returned to a position less than home, and the third of which is completed when the timing of such cam 60 causes the link 50 to reach a third (greater than the first) elevation from home—that is, from the previous less than home position, and then be returned to its home or starting position. More specifically, while such staged movement of the link 50 is that which permits the machine carried totalizer lines to be selectively engaged with the associated actuator racks at any of the above add, subtract, total, and sub-total timings, all in the precise manner to be described in detail later in the specification, the exact movement of such link 50 during each machine cycle of operation is best understood from the following chart which takes into account the precise extent and direction of link travel during specified degree-designated increments of cam operation.

| Cam Operating Time, degrees | Link Movement | Approximate Link Travel, inches | Approximate Link Positioning |
| --- | --- | --- | --- |
| 0–48 | Dwell | None | At home. |
| 48–69 | Upwardly | 3/32 | 3/32" from home. |
| 69–103 | ----do---- | 17/32 | 5/8" from home. |
| 103–140 | Downwardly | 5/8 | Back to home. |
| 140–162 | Dwell | None | At home. |
| 162–182 | Upwardly | 3/32 | 3/32" from home. |
| 182–215 | ----do---- | 17/32 | 5/8" from home. |
| 215–233 | Downwardly | 3/32 | 17/32" from home. |
| 233–242 | Dwell | None | At 17/32" from home. |
| 242–258 | Upwardly | 3/32 | 5/8" from home. |
| 258–278 | ----do---- | 3/32 | 23/32" from home. |
| 278–312 | ----do---- | 17/32 | 1¼" from home. |
| 312–353 | Downwardly | 1¼ | Back to home. |
| 353–360 | Dwell | None | At home. |

This precise operation of the totalizer engagement drive link 50 during each machine cycle of operation, which is so designated by the graphic illustration of the totalizer engaging and disengaging cam 60 (line one of FIG. 8), is understood most clearly when relating same to the illustration of FIG. 1. As shown in FIG. 1, the link 50 is in its normal or home position, where it remains until the associated totalizer engaging and disengaging cam 60 completes its first forty-eight degrees period of rotational movement. At such forty-eight degrees period of time, further rotational movement of the cam 60 first imparts a slight (3/32") upward shifting movement to the link 50, and thence continues upward shifting thereof until a total movement of 5/8" from home has been made with respect thereto. This latter positioning of the link 50 would be had at one hundred and three degrees cycling time, after which and until one hundred and forty degrees have been completed, rotation of such cam 60 permits the link 50 (under control of the spring 57) to return downwardly to its starting or home position. This completes the first of the above-set-out three stages of link movement performed during each machine cycle of operation, which, solely for the reasons explained later herein, has the upward shifting portion thereof divided into several distinct parts so designated by a slight pause taking place therebetween (at sixty-nine degrees cycling time). As understood from FIG. 1, the overall travel of such link 50 during this first stage of movement is equal to approximately one-half the length of each slot 51 provided therein—that is, where each of the totalizer engaging and disengaging shafts 26 extending therethrough would be disposed approximately centrally of the upper and lower ends thereof. When once returned to its home position (at one hundred and forty degrees), such link 50 so remains until one hundred and sixty-two degrees cycling time, when a further upward shifting movement of several distinct parts presents same again to a position 5/8" from home, which is had at two hundred and fifteen degrees cycling time. The next movement of such link 50 is again downwardly, but for a limited extent (3/32") only before such link remains stable—that is, is not returned to its home position. This stopping of the link prior to home takes place at two hundred and thirty-three degrees cycling time, and constitutes the completion of the second stage of link movement referred to hereinabove. After the completion of two hundred and forty-two degrees cycling time, further upward shifting of such link 50 takes place until same, at three hundred and twelve degrees cycling time, reaches a position 1¼" from home—this movement being, again for the reasons mentioned hereinafter, made in three distinct parts defined by slight pauses therebetween. Of course, when the link 50 is in this uppermost position (1¼" from home), the lower end of each slot 51 therethrough will come pretty close to abutting the associated totalizer engaging and disengaging shaft 26. Finally, to complete this third stage of link movement, the home positioning of such link 50 is regained at three hundred and fifty-three degrees cycling time, and such home positioning is maintained throughout the remainder of the machine cycle. From this it is clear that, and may thus be stated broadly that there are three distinct and separate movements upwardly of the link 50 during each machine cycle of operation, after two of which (the first and third) such link 50 is returned to its starting position, and after one of which (second), such link 50 is returned to a position somewhat less than its starting position.

Referring again to FIG. 1, it is seen that that portion of the totalizer engagement drive link 50 located adjacent each of the longitudinal slots 51 therethrough, in turn being likewise adjacent each of the totalizer lines provided, is formed with a hook-defining notch 52 in its rear edge and a like but opposing hook-defining notch 53 in its front edge. Over and above this, such portion of the link 50, in each instance, has a forwardly directed abutment positioning a further hook-defining notch 54 a precise distance below and forwardly of the notch 53. That is, while each of the horizontally aligned notches 52 and 53 extend within the link rear and front edges, respectively, the further notch 54 extends outwardly from the link front edge. The spacing-apart of such notches 53 and 54 is, for the scale herein employed, approximately nine sixteenths of an inch, as illustrated in FIG. 1. This, for the sake of further locating same, presents a notch 54 in approximate horizontal alignment with the lower end of each link carried slot 51. It is through regular operation of such link carried notches (at the timing, in the direction, and for the distances above mentioned), in conjunction with selective operation of the now-to-be-described selection mechanism operably associated therewith, that either an add timing, a subtract and total timing, or a sub-total timing of engagement and disengagement may be directed for any one or more of the machine carried totalizer lines.

Secured to the leftmost end of each totalizer line engaging and disengaging shaft 26, so as to be disposed on the outer side of the totalizer engagement drive link 50 supported thereby, is a totalizer engagement control arm 66—being positioned at a precise angular disposition thereon and appropriately fixed thereat by means of pinning a hub 67 thereof to such shaft 26. Rotatably mounted on a rear stud 68 of such control arm 66 is a totalizer engaging selection latch 69, which latch 69 has a lower stud 70 operably associated with a companion one of the hook-defining notches 52 provided along the rear edge of the totalizer engagement drive link 50. Rotatably mounted on a forward stud 71 of such control arm 66 is a totalizer disengaging selection latch 72, which latch 72 has a lower stud 73 operably associated with companion ones of the opposing and further hook-defining notches 53 and 54 provided along the front edge of such totalizer engagement drive link 50. A spring 74, stretched between the upper end portions of such engaging and disengaging selection latches 69 and 72, yieldingly urges the latch 69 that extent clockwise which presents same in abutment with the periphery of the control arm hub 67, at which position of such latch 69 the lower stud 70 thereof is maintained free and clear of the companion notch 52. While such spring 74 likewise urges the latch 72 in a counter-clockwise direction, the normal positioning thereof, rather than being controlled by same also coming into contact with the hub 67, is in a lesser rocked position in view of its lower stud 73 previously coming into abutment with the rear edge surface of an associated guide rail 75 secured, by means of screws 76 and the like, in a vertically disposed position along the outer surface of the machine framework left side plate 18. This normal, spring-urged position of the totalizer disengaging selection latch 72 likewise presents its lower stud 73 free and clear of the companion one of the notches 53 provided along the front edge of the totalizer engagement drive link 50, and, at the same time, maintains such stud 73 in constant alignment with the companion one of the additional notches 54 provided therealong. As is clear from FIG. 1, where each of the latches 69 and 72 is illustrated in its normal, spring-urged position, the above-described shifting movement regularly imparted to the totalizer engagement drive link 50 during each machine cycle of operation has no effect upon the rotational positioning of the totalizer engaging and disengaging shaft 26, other than, should such shaft 26 be not in its counter-clockwise rocked totalizer non-engaging position (as shown), the third stage of link movement—that is, when same is caused to reach an elevation one and one-quarter inches from home, will be effective for automatically returning the shaft 26 thereto. This is performed through the link carried further notch 54 coming into engagement with the lower stud 73 of the totalizer disengaging selection latch 72 at such time, to rock, through a carrying of the latch 72 upwardly, the totalizer engagement control arm 66 to that angular disposition illustrated in FIG. 1. Such arm positioning, as understood from previous description contained in the specification, presents the interconnected totalizer engaging and disengaging shaft 26 in its counter-clockwise, totalizer non-engaging position. Of course, should the shaft 26 be already in the position illustrated, where the associated totalizer wheels 14 are maintained free and clear of any engagement with the actuator racks 12, such third stage of link movement becomes an idle movement only as the further notch 54 will then just contact the latch stud 73 when reaching its uppermost (one and one-quarter inches from home) position during machine operation. Essentially, each notch 54 is effective for restoring an associated totalizer line to its normal, actuator rack disengaged position near the end of each machine cycle of operation should same have not been performed at a cycling time prior thereto.

Recalling now the first stage of link movement, where such link 50 moves upwardly five eighths of an inch from home and then is returned to home near the beginning of each machine cycle of operation, and also the second stage of link movement, where such link 50 moves again upwardly to a position five eighths of an inch from home and thence is returned downwardly only slightly toward home after mid-cycle of each machine operation, it is clear that should the totalizer engaging selection latch 69 be rocked from its normal position (as shown) an extent counter-clockwise to position its lower stud 70 in alignment with the companion notch 52 immediately prior to either such first or second stage of link movement, same would be effective for imparting a clockwise rocking movement to the totalizer engaging and disengaging shaft 26 during that period of cycling time in which the link 50 is caused to be shifted upwardly. That is, alignment of the stud 70 with the notch 52 immediately prior to link movement upwardly will cause, through the carrying of the latch 69 upwardly with the link 50, the latch carried control arm 66 to be rocked from its normal angular disposition (as shown) that extent clockwise which, through a like rocking of the interconnected totalizer engaging and disengaging shaft 26 thereby, presents the associated totalizer wheels 14 in mesh with the aligned actuator racks 12. Such a rocking of the shaft 26, from its normal totalizer non-engaging position to a totalizer engaging position (clockwise from that as shown in FIG. 1), is thus permitted at either one of two distinct cycling times during machine operation through the regular operation of link 50 thereduring, all depending upon the timing at which the totalizer engaging selection latch 69 is rocked so as to present its lower stud 70 in alignment with the corresponding one of the link carried notches 52.

Through selective rocking of such latch 69, by the mechanism and in the manner to be described shortly herein, totalizer engagement may thus take place either prior to the time that the actuator racks 12 receive their downward shifting movement (this being under control of the first stage of movement imparted to the link 50), or prior to the time that such racks 12 are returned upwardly to their starting positions (this being under control of the second stage of movement imparted to the link 50).

As known, automatic disengagement of any totalizer line is had during the third stage of movement imparted to the link 50, this being performed through the link further notch 54 then coming into engagement with the totalizer disengaging selection latch 72 carried lower stud 73. Over and above this, selective disengagement of any totalizer line may be performed during the second stage of link movement, if, immediately prior to such time, the totalizer disengaging selection latch 72 is caused to be rocked from that usual position which presents its lower stud 73 in alignment with the link further notch 54 to a position where such lower stud 73 is presented in alignment with the corresponding notch 53 of such link 50. If so done, upward shifting movement of the link 50 at such time would carry the latch 72 therewith, in turn returning the previously rocked engaging and disengaging shaft 26 counter-clockwise and back to its normal position. Of course, any changing of the angular disposition of the totalizer engagement control arm 66 from that as illustrated in FIG. 1, which will take place whenever the totalizer engaging selection latch 69 is caused to be carried upwardly with the link 50, will cause the totalizer disengaging selection latch 72 to move downwardly along the guide rail 75 an extent equal to the link imparted movement received by such latch 69. While spring 74 would retain the lower stud 73 of such latch 72 against the rear edge surface of such rail 75, the new positioning of such stud 73 along the rail 75 would now correspond to that horizontal plane previously held by the lower stud 70 of the totalizer engaging selection latch 69. That is, when the totalizer engagement drive link 50 is in its home position (as illustrated), stud 73 would be positioned slightly above and forwardly of its companion link carried notch 53. In effect, clockwise rocking of the totalizer engaging and disengaging shaft 26 under control of the link 50 actually reverses the elevational positions previously held by the several latches 69 and 72.

The precise means herein employed both for selecting which totalizer line is to be operated during a machine operation and for selecting at what cycling time such operation is to take place is further illustrated in FIG. 1. Since such means, like the previously-described link carried notches 52, 53, and 54, totalizer engagement control arm 66, totalizer engaging selection latch 69, and totalizer disengaging selection latch 72, is duplicated for each of the various totalizer lines included in the machine construction, the following description may relate to any one of the three lines used for the present disclosure. Mounted rotatably on a further stud 77 facing outwardly from the machine framework left side plate 18 is a selection latch operating arm 78. The overall shape of such arm 78 is such that an upper, rear surface portion 79 thereof is operably aligned both with the lower peripheral surface of a latch operating stud 80 carried by the selection latch 69 and with the lower peripheral surface of a like latch operating stud 81 carried by the selection latch 72. A spring 82, stretched between such arm 78 and still a further stud 83 in the machine framework left side plate 18, yieldingly urges the arm 78 counter-clockwise until a lower, forward shoulder portion thereof comes into contact with such stud 83. While so positioned, which is the normal, spring-urged positioning of such selection latch operating arm 78, the upper rear surface 79 thereof lies in extremely close proximity to, and perhaps even in slight tangential engagement with, the lower peripheral surface of that operating stud carried by the totalizer engaging selection latch 69—being hereinabove designated as stud 80. With this overall arrangement between the arm surface 79 and the stud 80, it is clear that any clockwise rocking movement imparted to the selection latch operating arm 78 will transfer a counter-clockwise rocking movement to the totalizer engaging selection latch 69, whereby the lower stud 70 thereof is caused to be moved forwardly and into alignment with the companion notch 52 provided along the rear edge of the totalizer engagement drive link 50. This permits the latch 69 to move upwardly with such drive link 50, in turn causing the associated totalizer engaging and disengaging shaft 26 to be rotated clockwise at a precise time during machine cycling. Of course, as to when such shaft 26 is so operated during machine cyling—either during the first stage of link movement or during the second stage of link movement, depends upon when the selection latch operating arm 78 is caused to be rocked contrary (clockwise) to the normal tension of spring 82. Furthermore, whether or not such shaft 26 is so operated during machine cycling depends upon whether or not the arm 78 is actually rocked out of its normal, spring-urged position. If not, upward shifting of the link 50 during both the first and second stages of movement thereof would be merely idle movements, thus having no effect whatsoever upon the rotational positioning of the shaft 26. When such shaft 26 is caused to be so rotated clockwise, however, either during the first stage or the second stage of link movement completed during a machine cycle of operation, it is axiomatic that, as the selection latch 69 operating stud 80 is then moved upwardly, the companion latch operating stud 81 provided in the totalizer disengaging selection latch 72 is moved in a like manner downwardly until same reaches close proximity to or perhaps slight tangential engagement with the arm upper surface 79. That is, the prior positioning of the stud 80 with respect to such selection latch operating arm surface 79 is now gained by the stud 81. This permits, if such happens during the first stage of link movement, further clockwise rocking of the selection latch operating arm 78 to be initiated for imparting a like clockwise rocking movement to the totalizer disengaging selection latch 72 prior to commencement of the second stage of link movement, hence enabling the companion link notch 53, when same comes into engagement with the aligned latch lower stud 73, to return the totalizer engaging and disengaging shaft 26 counter-clockwise to its normal, totalizer non-engaging position. Should, however, such clockwise rocking of the shaft 26 be had during the second stage of link movement, it is clear that the counter-clockwise return to normal thereof will take place automatically near the end of the machine cycle of operation, as the companion link further notch 54 moves upwardly and into contact with the stud 73 while presented at its lower position along the guide rail 75.

The timing at which the selection latch operating arm 78 is so rocked during machine cycling, if at all, is controlled by selective energization of a precisely designated solenoid operably interconnected to the forward end portion thereof, such as solenoid 84 for the upper totalizer line hereof, solenoid 85 for the intermediate totalizer line hereof, and solenoid 86 for the lower totalizer line hereof (FIG. 1). Although not precisely illustrated herein, the mounting of each of such solenoids is through use of any suitable means maintaining same fixedly to the outer surface of the machine framework left side plate 18, at a zone spaced below the forward end portion of the associated selection latch operating arm 78. With this overall arrangement, it is clear that energization of such solenoid, in each instance, will overcome the normal tension of spring 82 and cause the interconnected selection latch operating arm 78 to be rocked a precise distance clockwise about its mounting stud 77. As is known, this rocking of the arm 78 imparts either a counter-clockwise rocking movement to the totalizer engaging selection latch 69 or a clockwise rocking movement to the totalizer disengaging selection latch 72, all depending upon the present positioning of the associated totalizer line with respect to the actuator racks 12. While the totalizer engagement drive link 50 is regularly operated through the above three stages of movement during each machine cycle of operation, each of the operating arm solenoids may be selectively energized one or more times thereduring. Of course, each of such solenoids may likewise be not energized at all during machine cycling, whereby the associated totalizer line remains disengaged from the actuator racks 12 throughout the machine operation. As is known, all totalizer lines are, if not thereat, caused to be returned automatically to a disengaged position with respect to such racks 12 near the end of the preceding machine operation.

While the mechanical details are not included herein, which is due to the completeness of the Rosener et al. application, Serial No. 221,459 (both in illustration and description), the above cam shaft 61, or a comparable cam shaft regularly included in the accounting machine construction, is provided with four additional plate cams, one being developed for closing a normally open switch member 87 associated therewith between fifty degrees and two hundred and twenty degrees of each cam shaft cycle of operation; another being developed for closing a normally open switch member 88 associated therewith between thirty degrees and seventy degrees of each cam shaft cycle of operation; another being developed for closing a normally open switch member 89 associated therewith between one hundred and forty-five degrees and one hundred and eighty-five degrees of each cam shaft cycle of operation; and still another being developed for closing a normally open switch member 90 associated therewith both between thirty degrees and seventy degrees and between one hundred and forty-five degrees and one hundred and eighty degrees of each cam shaft cycle of operation. As so illustrated in FIG. 4, switch member 87, hereinafter referred to as tens transfer switch member 87, is included in an electrical circuit extending between a direct current supply line R+ and a direct current return line R— (described in detail in the Rosener et al. application), the provision of which circuit is to supply current to the above-mentioned tens transfer solenoid 43 (see also FIG. 2) at the switch member 87 designated timing during those machine operations initiated for entering a digit amount subtractively to any one or more of the totalizer lines. As further illustrated in FIG. 4, each of the switch members 88, 89, and 90, hereinafter referred to as sub-total switch member 88, as add switch member 89, and as subtract and total switch member 90, is included in a precise branch of a further electrical circuit extending between the lines R+ and R—, the provision of which further circuit is for energizing a selected one or more of the above selection latch operating arm solenoids 84, 85, and 86 (FIG. 1) at either the switch member 88, switch member 89, or switch member 90 designated timing during machine cycling. That is, in the manner shortly described, any one of the selection latch operating arm solenoids 84, 85, 86 may be directed for energization at that precise cycling time controlled by regular operation of the sub-total switch member 88, at that precise cycling time controlled by regular operation of the add switch member 89, or at those precise cycling times controlled by regular operation of the subtract and total switch member 90.

As understood from FIG. 1, the selection for operation of any one totalizer line herein employed is through the clockwise rocking of the associated selection latch operating arm 78 at some precise time during the machine operation in progress. Without such happening, the totalizer line remains in its normal, disengaged position with respect to the associated actuator racks. As further understood from FIG. 4, whether or not a selection latch operating arm 78 is so rocked during cycling, and, if so, at what time thereduring, is dependent both upon the selection for energization of its interconnected solenoid and upon, if selected, which of the three switch member contained circuit branches has control thereover during machine cycling. As is known from the Rosener et al. application, the above-mentioned distribution control keys used for selecting a particular set of totalizer wheels 14 to be aligned with the actuator racks 12 likewise are used for determining which totalizer line will be selected for shifting to and from engagement with such racks 12 during any one machine cycle of operation. This latter totalizer line selecting function is determined by the row or bank in which a depressed distribution control key is contained, whereas the previous totalizer wheel aligning function is determined by the positioning of such depressed key within the row or bank. With this in mind, it is understood that the accounting machine employed herein for disclosing the instant invention would contain three rows or banks of such distribution control keys, the depression of a key in each of which would select for energization a particular one only of the solenoids 84, 85, and 86. The particular means for doing this is herein illustrated (FIG. 4) in the form of a precisely designated, normally open relay contact being included in the current path to each of such solenoids, such as contact K9a for solenoid 84, contact K19a for solenoid 85, and contact K29a for solenoid 86. In each instance, the selective closing of such relay contacts is through the energization of an associated row relay, which row relay in turn is associated with and is directed for energization by that row or bank of distribution control keys having the depressed key contained therein. Through this overall procedure of operation, and for more thoroughly defining same with respect to the instant invention, row relay contact K9a may be considered as becoming closed whenever a distribution control key contained within the first row or bank thereof is caused to be depressed, row relay contact K19a may be considered as becoming closed whenever a like key of the second row or bank thereof is caused to be depressed, and row relay contact K29a may be considered as becoming closed whenever such a key in the third row or bank thereof is caused to be depressed. Thus, for the purpose of the present description, the uppermost totalizer line (FIG. 1) is selected for engagement with the associated actuator racks 12 whenever a first keybank contained distribution control key is selected and depressed, the intermediate totalizer line (FIG. 1) is so selected whenever a second keybank contained distribution control key becomes depressed, and the lowermost totalizer line (FIG. 1) is likewise so selected whenever a third keybank contained distribution control key is depressed.

Over and above this precise means for selecting a particular totalizer line for operation, the overall makeup of the accounting machine included in the above-referred-to Rosener et al. application likewise provides both a selectively programmable means and a selectively operable transaction key means for determining the timing of operation during machine cycling of that totalizer line selected—that is, whether the engagement thereof with the actuator racks is to be performed at add timing, at subtract timing, at total timing, or at sub-total timing. In other like or similar accounting machines, such as those disclosed both in the above patent (No. 2,930,523) and co-pending application (Serial No. 9,261) to and by Raymond A. Christian et al., a selectively operable transaction key means only is provided for such timing of operation purpose. For the sake of simplicity both in the description and understanding of the instant invention, this latter, selectively operable transaction key means only type of system is herein employed for determining the timing of operation of any one totalizer line. Thus, as is the case with each of the above Christian et al. references, it may be assumed that the accounting machine chosen to disclose the present invention is provided with a precisely designated add transaction key, with a precisely designated subtract transaction key, with a precisely designated total transaction key, and with a precisely designated sub-total transaction key—any one of which may be selectively depressed along with a selected one of the distribution control keys arranged in the three separate banks or rows. Furthermore, while any of the well known switch arrangements may easily be fitted to the instant invention for determining the particular type of operation to be performed by the selected totalizer line—that is, determine the precise timing of engagement and disengagement thereof during machine cycling, the method herein used in that of having each of the specifically designated transaction keys, when depressed, to prescribe immediate energization of an associated and like-designated relay. Such relay, in turn, has an associated contact or contacts thereby caused to be transferred for directing a flow of current to be had by the distribution control key selected solenoid 84, 85, or 86 through one and only one of those circuit branches permitted, through regular operation of the included switch members 88, 89, and 90, to pass current at and for a precise time or times only during each machine cycle of operation. A thorough understanding of this overall method, as same is included in the circuitry illustrated in FIG. 4, will be had from the following detailed description of totalizer engagement and disengagement for performing each of the various add, subtract, total, and sub-total machine functions.

*Total Function*

As known, the totaling-out of any totalizer is performed by having the selected set of totalizer wheels 14 brought into engagement with the associated actuator racks 12 prior to downward shifting thereof, maintained in engagement throughout the downward shifting thereof, and removed from engagement therewith prior to the return upward shifting thereof. This causes the wheels 14 to be rotated from an accumulated-amount-defining position counter-clockwise until same are stopped by the transfer trip plate 28 at a zero position (as shown in FIG. 3), and thereafter remain at such zero position. As understood from line five of FIG. 8, such a total function is performed whenever the selected totalizer line is caused to be shifted forwardly to a rack engaging position between approximately seventy degrees and one hundred degrees of a machine cycle of operation, be retained in such engaging position until approximately one hundred and eighty degrees thereof, and be returned rearwardly to its normal, rack non-engaging position by the time that approximately two hundred and ten degrees cycling time has been completed. Recalling now the previously-described operation of the totalizer engagement drive link 50 regularly completed during each machine cycle of operation, as graphically illustrated in line one of FIG. 8, it is clear that this timing of totalizer engagement and disengagement may be had in the following manner.

Depression of the accounting machine carried total transaction key, through the then directed energization of its associated total relay (not shown), causes a normally open total relay contact K10a to become closed, and, at the same time, causes a normally closed total relay contact K10b to become opened (FIG. 4). As known, one of the normally open row relay contacts K9a, K19a, or K29a will likewise be closed at this time, as designated by the keyboard positioning of that distribution control key selected and depressed along with the total transaction key. Assuming, for the sake of description, that such distribution control key is contained in the first row or bank of such keys, it is clear that, through the presently transferred relay contacts K10a and K9a, energization of the upper totalizer line solenoid 84 will be prescribed at and for several distinct periods of time during the instant machine operation, as controlled by regular operation of the subtract and total switch member 90 thereduring. In accordance with the regular operation of such switch member 90 during each machine cycle of operation, the presently selected solenoid 84 will receive an energizing current thereto both between thirty degrees and seventy degrees cycling time and between one hundred and forty-five degrees and one hundred and eighty degrees cycling time. The precise location of the presently opened total relay contact K10b within the circuitry of FIG. 4 is such that neither the sub-total switch member 88 defining circuit branch nor the add switch member 89 defining circuit branch may have any control over the selected solenoid 84 at this time—such being true even though one or the other of the associated transaction keys has been inadvertently depressed.

As understood from the graphic illustration of FIG. 8, the initial energization of solenoid 84 (at thirty degrees cycling time) is prior to the time that the regularly actuated totalizer engagement drive link 50 starts its first stage of movement. In view of this, the clockwise rocking movement imparted to the selection latch operating arm 78 interconnected to the solenoid 84 will present, as herein illustrated in FIG. 5A, the associated totalizer engaging selection latch 69 in that position (counter-clockwise from home) where, as further illustrated in FIG. 5B, the upward shifting portion of the first stage of link 50 movement becomes effective for rocking the totalizer engaging and disengaging shaft 26 from its normal (FIGS. 1 and 5A), totalizer non-engaging position a precise distance clockwise to its totalizer engaging position (FIG. 5B). As described previously, the actual rocking of such shaft 26 takes place as the link carried notch 52 is moved into engagement with the lower stud 70 of the latch 69, which is at sixty-nine degrees cycling time (line one of FIG. 8). While initial upward movement of the link 50 actually starts at forty-eight degrees cycling time (line one of FIG. 8), there is no notch 52 and stud 70 contact made until the just-mentioned later point of time, at which point the link 50 pauses slightly to overcome any jerking or twisting of the shaft 26 when same is first started in motion.

As also described previously, it is the clockwise rocking of the shaft 26 which imparts a forward, rack engaging movement to, in this instance, the associated upper totalizer line. The cycling time at which the current is removed from the herein selected solenoid 84 (at seventy degrees) is well after the time at which the latch stud 70 is received within the link carried notch 52, hence not allowing such stud 70 to become disaligned with the notch 52 until shaft rocking actually commences. Thereafter, as can be understood from FIG. 5B, the precise configuration of the link notch 52 itself (being hooked shaped) is effective for maintaining the latch stud 70 therewithin—in turn holding the latch 69 in its counter-clockwise rocked position until the peak (at one hundred and three degrees) of the first stage of link movement has been reached. That is, the previous overcoming of the interconnected spring 74 through energization of the solenoid 84 is now maintained, as the selection latch operating arm 78 has been permitted to return counter-clockwise to home, solely by the notch 52 itself holding onto the stud 70. As can be understood from a comparison of lines one and five of FIG. 8, the above link 50 directed rocking of shaft 26 at this time will present the selected set of wheels 14 of the upper totalizer line in engagement with the associated actuator racks 12 prior to the time during machine cycling that same start their downward shifting movement. This, as is known, will cause such wheels 14 to be rotated counter-clockwise until the long tooth 14a of each of same comes into contact with the upper tooth 28a of the associated transfer trip plate 28 (FIG. 3), in turn setting the racks 12 in accordance with the digit amount contained in such wheels 14.

Shortly after the totalizer engagement drive link 50 starts its downward return to home shifting during such first stage of movement thereof, as can be understood from FIG. 5C, spring 74 becomes active for returning the totalizer engaging selection latch 69 clockwise to its normal, lower stud 70 and link notch 52 non-aligning position—this happening just as soon as the link notch 52 releases its hold over the latch carried stud 70. When the home position of such link 50 is again reached (at one hundred and forty degrees cycling time), a slight lapse in time takes place before (at one hundred and forty-five degrees cycling time), as directed by the second energizing current received by solenoid 84 through regular operation of the subtract and total switch member 90, a second clockwise rocking movement is imparted to the selection latch operating arm 78. Rocking of the arm 78 at this time, as illustrated in FIG. 5C, now causes the totalizer disengaging selection latch 72 to be rocked clockwise that extent which, as the link 50 is again shifted upwardly during its second stage of movement (FIG. 5D), the companion notch 53 therein soon engages the latch lower stud 73 and carries same upwardly. Of course, as such is done (FIG. 5D), the previous rocking of the totalizer engaging and disengaging shaft 26 is effectively reversed and such shaft 26 is caused to be again returned to its starting position. This return to normal of the shaft 26 is completed by the time the peak of the link second stage of movement is reached (see line one of FIG. 8). When considering both lines one and five of FIG. 8, it is clear that this rocking of the shaft 26 is effective for removing the selected set of totalizer wheels 14 from engagement with the associated actuator racks 12 prior to the time that such racks start to move upwardly to their starting positions, hence enabling the previous returning to zero of each of such wheels 14 as the racks 12 moved downwardly to be not changed as such racks are returned upwardly. Although the definite cycling time at which the racks 12 are first moved downwardly and thence returned upwardly during each machine operation has not been presented previously, it is clear from line five of FIG. 8 that rack movement downwardly must take place some time between one hundred degrees and one hundred and eighty degrees cycling time, and that rack movement upwardly must take place some time after two hundred and ten degrees cycling time. More specifically, while same has not been graphically illustrated herein, the precise movement of the actuator racks 12 during each machine cycle of operation is downwardly between one hundred and two degrees and one hundred and sixty-seven degrees cycling time, and upwardly between two hundred and thirty-four degrees and two hundred and seventy-five degrees cycling time.

The next movement of the link 50, slightly downwardly from its peak position during the completion of the second stage of movement thereof (which is reached at two hundred and thirty-three degrees cycling time), again permits spring 74 to become active for now returning the totalizer disengaging selection latch 72 counter-clockwise to its normal, lower stud 73 and link notch 53 non-aligning position (FIG. 5E)—this happening just as soon as the link notch 53 releases its hold over the latch carrying stud 73. As known, the extent of such spring-urged movement to the latch 72 is defined by the lower stud 73 thereof coming into contact with the associated guide rail 75. As illustrated in FIG. 5E, both the totalizer engaging and disengaging shaft 26 and the several latches 69 and 72 are again in their starting or normal positions, which remains true throughout the remainder of the machine cycle of operation in progress. While the third and final stage of link movement includes further upward shifting of the link 50 (phantom line illustration in FIG. 5E), same is an idle movement only since the further notch 54 provided therein will actually move upwardly only to that position previously gained by the latch stud 73. The overall effect of this would be an assurance that the shaft 26 has been returned fully to its totalizer non-engaging position during the second stage of link movement. Of course, the final return to home of such link 50 (between three hundred and twelve degrees and three hundred and fifty-three degrees cycling time) during the third stage of movement thereof is solely for the purpose of presenting same at its starting position prior to the initiation of a next machine cycle of operation (as illustrated in FIG. 1).

*Sub-Total Function*

Like the just-described total function, a sub-total function may be directed for a selected totalizer line by engaging the wheels 14 thereof with the associated actuator racks 12 prior to the time that same are moved downwardly during the machine cycle, but, unlike such total function, not disengaging such wheels 14 from the racks 12 until after the upward return movement thereof has been completed during machine cycling. That is, as graphically illustrated in line four of FIG. 8, a sub-totaling machine function is had whenever the totalizer engagement operation takes place between approximately seventy degrees and one hundred degrees cycling time and the totalizer disengagement operation takes place between approximately two hundred and eighty degrees and three hundred and ten degrees cycling time. To initiate such an operation, again with respect to the upper totalizer line hereof for the sake of clarity in description, depression of the accounting machine carried sub-total transaction key, through energization of its associated sub-total relay (not shown), causes a normally open sub-total relay contact K20a to become closed and, at the same time, also causes an associated normally closed sub-total relay contact K20b to become opened (FIG. 4). Through the transferring of such relay contact K20a, the normal condition (closed) of the previously-mentioned total relay contact K10b, and the simultaneous closing of the normally open row relay contact K9a, solenoid 84 is now directed to receive a flow of current under control of the sub-total switch member 88—which would be between thirty degrees and seventy degrees of the machine cycle of operation. Again, the transaction key directed opening of relay contact K20b prevents either one of the remaining switch member 89 and switch member 90 defined branches of the illustrated circuitry (FIG. 4) from being active at this time.

In keeping the above-set-out regular operation of the totalizer engagement drive link 50 in mind (line one of FIG. 8), it is clear that the initial energization of solenoid 84 at this time, through the clockwise rocking of its associated selection latch operating arm 78 (FIG. 7A) will again direct the distribution control key selected set of wheels 14 on the upper totalizer line to be shifted into engagement with the associated actuator racks 12 during the time that the upward shifting portion of the first stage of link movement is being completed (see also FIG. 7B). Since the precise shifting of the totalizer line at this time is identical to that fully described above with respect to the total function (FIGS. 5A and 5B), a repeated discussion thereof with respect to FIGS. 7A and 7B is deemed not necessary at this time. In both instances, as illustrated, clockwise rocking of the totalizer engaging and disengaging shaft 26 is performed by the link notch 52 first engaging and then maintaining a hold over the lower stud 70 of the totalizer engaging selection latch 69 until the link 50 gains its peak movement (at one hundred and three degrees cycling time), which is prior to the time that the actuator racks 12 are caused to move downwardly during machine cycling. Return to home of the link 50 during such first stage of movement (FIG. 7C) again releases its control over the latch 69, whereupon the spring 74 returns same clockwise to its normal, hub 67 abutting position. This takes place at approximately one hundred and forty degrees cycling time, which is well after the time that solenoid 84 becomes deenergized through regular operation of switch member 88. Since further energization of such solenoid 84 is not called for by the switch member 88, upward shifting of the link 50 during its second stage of movement has no effect whatsoever upon the previous clockwise rocking of the totalizer engaging and disengaging shaft 26, hence leaving such shaft 26 in its totalizer engaging position (FIG. 7D) until the third and final stage of link movement is caused to be performed. At this time, as can be understood from FIG. 7E, upward shifting of the link 50 imparts a mandatory counter-clockwise rocking movement to the shaft 26 as the link further notch 54 moves into engagement with the lower stud 73 of the totalizer disengaging selection latch 72. As evidenced by line one of FIG. 8, such mandatory counter-clockwise rocking of the shaft 26 is completed by the time that three hundred and twelve degrees of the machine cycle of operation have taken place. Of course, this automatic returning of the totalizer engaging and disengaging shaft 26 to its starting position does not remove the totalizer wheels 14 from engagement with the actuator racks 12 until after such racks have been returned upwardly to home; hence permitting same to be effective for returning such totalizer wheels 14 to their original setting. That is, while the present totalizer engagement prior to downward shifting of the actuator racks 12 caused the selected set of totalizer wheels 14 to be rotated reversely (counter-clockwise) to a zeroized state, present totalizer disengagement is so timed to permit the upward return shifting of such racks 12 to rotate additively (clockwise) each of such wheels 14 from zero and back to its starting position. Specifically, the overall totalizer engaging and disengaging operation just described for performing the sub-total machine function provides (like the previously-described total function) reading of the selected set of totalizer wheels 14 through downward shifting of the actuator racks 12, and provides (contrary to such total function) returning of the selected set of totalizer wheels 14 to its original setting through upward shifting of such actuator racks 12.

Subtract Function

While both the just-described sub-total machine function and the previously-described total machine function are each initiated for determining the accumulated amount contained within a selected totalizer—that is, are performed in the absence of having selected ones of the machine carried amount entry keys presented in depressed positions, both the presently-described subtract machine function and the hereinafter-described add machine function are each initiated for actually increasing or decreasing the accumulated amount contained within a selected totalizer; hence being performed only after selected amount entry keys have been depressed. As has been mentioned earlier in this specification, the timing of totalizer engagement and disengagement for the subtract function is identical to that for the total function, the only difference being in whether or not the set of totalizer wheels 14 then selected are permitted to travel beyond zero when rotated in a reverse (counter-clockwise) direction. As known, such wheels 14 are positively stopped at zero by the normal positioning of the associated transfer trip plates 28 (FIG. 3). As also known, prior energization of the tens transfer solenoid 43 (FIG. 2) overcomes the normal positioning of such plates 28, whereby each of the associated wheels 14, when rotated reversely, may travel beyond zero if so needed to represent the particular digit corresponding to the associated amount entry key caused to be depressed. Thus, it is axiomatic that depression of the machine carried subtract transaction key, mentioned above, in addition to prescribing for a selected one of the solenoids 84, 85, or 86 several distinct periods of energization under control of the subtract and total switch member 90 (FIG. 4), will likewise prescribe a period of energization for the tens transfer solenoid 43 under control of the associated switch member 87 (FIG. 4). Specifically, depression of the subtract transaction key, through the directed energization of its associated subtract relay (not shown), is effective for closing a pair of normally open subtract relay contacts K30a1 and K30a2 (FIG. 4). As understood from FIG. 4, through this transaction key directed closing of the subtract relay contact K30a1, in conjunction with the normally closed sub-total relay contact K20b, the normally closed total relay contact K10b, and the distribution control key directed closing of a selected one of the row relay contacts K9a, K19a, or K29a, one of the selection latch operating arm solenoids 84, 85, or 86 will receive electric current at those several and distinct periods of cycling time hereinabove stated as being directed thereto by regular operation of the subtract and total switch member 90 during machine cycling. As also understood from FIG. 4, such transaction key directed simultaneous closing of the further subtract relay contact K30a2 will likewise direct electric current to the tens transfer solenoid 43 at that precise period of cycling time (between fifty degrees and two hundred and twenty degrees) prescribed by regular operation of the tens transfer switch member 87 during machine cycling. Hence, like the total transaction key, the subtract transaction key completes an energizing circuit to a selected one of the solenoids 84, 85, or 86 through the switch member 90 defined circuit branch of FIG. 4, and, unlike the total transaction key, the subtract transaction key in addition completes an energizing circuit to the transfer solenoid 43 through the switch member 87 defined circuit path of FIG. 4.

Due to the sameness in the overall totalizer engaging and disengaging operation for both the subtract machine function and the total machine function, the latter of which has been described in detail hereinabove with respect to FIGS. 5A through 5E, a repeated discussion of such operation may be assumed to be incorporated at this, subtract function defining, point in the specification. That is, the solenoid directed clockwise rocking movement imparted to the selected totalizer engaging and disengaging shaft 26 during the link first stage of movement (FIGS. 5A and 5B), the solenoid directed counter-clockwise rocking movement imparted to such shaft 26 during the link second stage of movement (FIGS. 5C and 5D), and also the absence of any rocking movement being imparted to such shaft 26 during the link third stage of movement (FIG. 5E) is again now had all in that precise manner described in detail hereinabove. As understood from a comparison of lines two and five of FIG. 8, the timing of totalizer engagement for both the subtract function and the total function is prior to downward shifting of the totalizer actuator racks 12, while the timing of totalizer disengagement therefor is prior to upward return shifting of such racks 12.

As is known from previous description, the present energization of the tens transfer solenoid 43 prior to and throughout the period of totalizer wheel 14 and actuator rack 12 engagement will enable the selected set of totalizer wheels 14 to receive subtractively therein the overall digit amount selectively set up on the accounting machine keyboard. This, it is recalled (FIG. 3), is through the solenoid 43 directed rocking from normal of each transfer trip plate 28 to that position where the upper tooth 28a thereof does not block the path of travel of the totalizer wheel long tooth 14a; hence enabling such tooth 14a during reverse (counter-clockwise) rotation to move any amount key prescribed digit amount beyond zero.

Add Function

As understood from line three of FIG. 8, an add machine function (i.e. the entering of an amount key designated digit amount additively to a selected totalizer) is herein performed whenever the totalizer shiftable framework 10 is moved forwardly for engaging the selected set of totalizer wheels 14 with the corresponding actuator racks 12 between approximately one hundred and eighty degrees and two hundred and ten degrees of a machine cycle of operation, remains in its forwardly shifted position for rotation of such wheels 14 by the actuator racks 12 until approximately two hundred and eighty degrees cycling time, and then is moved rearwardly to its normal, totalizer wheel 14 disengaging position between such two hundred and eighty degrees and approximately three hundred and five degrees cycling time—prior to which wheel 14 engaging time the actuator racks 12 move downwardly for differential setting under control of the depressed amount keys, and prior to which wheel 14 disengaging time such actuator racks 12 return upwardly to their starting positions. In view of such timing of engagement and disengagement of the totalizer wheels 14 with the actuator racks 12 (after rack downward shifting movement and after rack upward return movement, respectively), it is clear that the wheels 14, in each instance, are rotated in an additive (clockwise) direction by such racks 12 as they are returned upwardly from their earlier set positions corresponding to the various amount entry keys depressed. As set out previously in the specification, the actuator racks 12 reach their downwardmost or differentially set positions by one hundred and sixty-seven degrees cycling time of each machine operation, and commence to move upwardly therefrom, back toward home, at two hundred and thirty-four degrees cycling time thereof. As now described with respect to FIGS. 6A through 6E, engagement of a selected totalizer line may be completed by the instant invention shortly after downward movement of the actuator racks 12 has taken place and prior to the start of the return movement upwardly thereof—that is, between one hundred and sixty-seven degrees and two hundred and thirty-four degrees cycling time, with disengagement of such line not taking place until after the racks 12 have been fully returned to home (at two hundred and seventy-five degrees cycling time).

Returning again to FIG. 4, it is seen that depression of the machine carried add transaction key, through its associated relay (again not shown), causes a normally open add relay contact K40a to become closed—which contact, in conjunction with the normally closed sub-total relay contact K20b, the normally closed total relay contact K10b, and the distribution control key directed closing of a selected one of the row relay contacts K9a, K19a, or K29a, completes an electric circuit to one of the selection latch operating arm solenoids 84, 85, or 86 at that precise time (between one hundred and forty-five degrees and one hundred and eighty-five degrees) prescribed by regular operation of the add switch member 89 during machine cycling. Assuming again that the upper totalizer line is presently selected for operation, it is seen (FIG. 6A) that the engaging and disengaging shaft 26 thereof remains in its normal counter-clockwise rocked, totalizer non-engaging position throughout the first stage of movement completed by the totalizer engagement drive link 50. That is, since the add switch member 89 does not complete a circuit to the selection latch arm operating solenoid 84 prior to such time, the upward shifting portion of the link first stage of movement (between sixty-nine degrees and one hundred and three degrees) is an idle movement only and makes no change whatsoever to the normal positioning of such shaft 26. As illustrated in FIG. 6A, the associated link notch 52 will pass freely by the latch 69 lower stud 70 at this time. Since solenoid 84 energization does, however, take place prior to the beginning of the second stage of link movement (as can be understood from FIG. 6B), the upward shifting portion thereof (FIG. 6C) will impart a clockwise rocking movement to the totalizer engaging and disengaging shaft 26; hence causing the selected set of totalizer wheels 14 of the upper totalizer line to be engaged with the associated actuator racks 12 by the time that two hundred and fifteen degrees cycling time has been completed (line one of FIG. 8). This timing of totalizer engagement is within that overall period of time lapse between downward shifting and upward return shifting of the actuator racks 12 during machine cycling. The actual rocking of shaft 26 is again performed by the link notch 52 coming into engagement with the lower stud 70 of the totalizer engaging selection latch 69, in view of the solenoid 84 directed counter-clockwise rocking from normal of the latch 69 just prior to commencement of the link 50 second stage of movement (FIGS. 6B and 6C). Totalizer disengagement, through counter-clockwise return rocking of the engaging and disengaging shaft 26, again takes place automatically during the add function as the engagement drive link 50 moves upwardly to reach its uppermost peak position during the third stage of movement thereof, which peak position is gained at three hundred and twelve degrees cycling time. Prior to such time, as understood from FIG. 6D, latch 69 is permitted to be returned clockwise by spring 74 as the downward shifting portion of the link second stage of movement is being performed, again being had immediately as the lowering of link notch 52 releases its hold over the latch lower stud 70. This enables, during the upward shifting portion of the link third stage of movement (FIG. 6E), the link further notch 54 to carry the totalizer disengaging selection latch 72 back upwardly to its starting position, where same will remain as the link 50 returns to home near the end of the machine cycle of operation. Of course, as has been described hereinabove with respect to the sub-total machine function (FIGS. 7D and 7E), the presently described totalizer disengaging operation (FIGS. 6D and 6E) during an add machine function takes place shortly after the return shifting to home of the actuator racks 12, previously set under control of the machine amount keys, has imparted the desired movement (clockwise) to the selected set of totalizer wheels 14. In recalling such earlier described sub-total function, this mandatory timing of totalizer disengagement was effective for returning the selected set of totalizer wheels 14 to their original or starting positions. When considering the present add function, this mandatory timing of totalizer disengagement is effective for increasing the selected set of totalizer wheels 14 by that digit amount set up on the amount keys of the machine keyboard.

From the foregoing rather brief operational discussion of the instant invention for selectively performing any of four different machine functions (total, sub-total, subtract, and add), it is clear that, while the precise mechanism herein shown and described will admirably fulfill the object primarily stated, such invention is susceptible to various changes (both in structural form and electrical controls) which are considered to come within the scope and spirit of the overall invention. Thus, the one form or embodiment of such invention herein disclosed is not intended to confine same beyond the limitations which may be imposed by the following claims.

What is claimed is:

1. In an accounting machine having a totalizer and actuators for the totalizer, said actuators being regularly moved in one direction and returned therefrom during each machine operation, and said totalizer being selectively movable into and out of engagement with said actuators during each machine operation for performing precise amount entry and totalizer reading machine functions thereduring, the combination of a totalizer engagement drive member regularly operated through three stages of movement during each machine operation, the first stage of movement being performed prior to movement of said actuators in said one direction, the second stage of movement being performed after movement of said actuators in said one direction and before return movement of said actuators from said one direction, and the third stage of movement being performed after return movement of said actuators from said one direction; connection means between said totalizer and said drive member; said connection means being normally positioned ineffective for connecting said totalizer with said drive member but adapted to be selectively positionable effective for connecting said totalizer with said drive member throughout the staged movement thereof; means for positioning said connection means effective during machine operation; first interconnected means directing said positioning means to position said connection means effective both during the first and second stages of movement of the drive member during machine operation, whereby, as directed by the timing of the drive member first stage of movement, the totalizer is caused to be engaged with the actuators prior to movement thereof in said one direction, and whereby, as directed by the timing of the drive member second stage of movement, the totalizer is caused to be disengaged from the actuators after movement thereof in said one direction; second interconnected means directing said positioning means to position said connection means effective both during the second and third stages of movement of the drive member during machine operation, whereby, as directed by the timing of the drive member second stage of movement, the totalizer is caused to be engaged with the actuators prior to return movement thereof from said one direction, and whereby, as directed by the timing of the drive member third stage of movement, the totalizer is caused to be disengaged from the actuators after return movement thereof from said one direction; and type-of-operation transaction means for calling into being one or the other of said first and second interconnected means during each machine operation.

2. In an accounting machine having a totalizer and actuators for the totalizer, said actuators being regularly moved in one direction and returned therefrom during each machine operation, and said totalizer being selectively movable into and out of engagement with said actuators during each machine operation for performing precise amount entry and totalizer reading machine functions thereduring, the combination of a totalizer engagement drive member regularly operated through three stages of movement during each machine operation, the first stage of movement being performed prior to movement of said actuators in said one direction, the second stage of movement being performed after movement of said actuators in said one direction and before return movement of said actuators from said one direction, and the third stage of movement being performed after return movement of said actuators from said one direction; connection means between said totalizer and said drive member; said connection means being normally positioned ineffective for connecting said totalizer with said drive member but adapted to be positionable effective for connecting said totalizer with said drive member throughout the staged movement thereof; means selectively operable during machine operation for positioning said connection means effective thereduring; first interconnected means directing the operation of said positioning means to position said connection means effective both during the first and second stages of movement of the drive member during machine operation, whereby, as directed by the timing of the drive member first stage of movement, the totalizer is caused to be engaged with the actuators prior to movement thereof in said one direction, and whereby, as directed by the timing of the drive member second stage of movement, the totalizer is caused to be disengaged from the actuators after movement thereof in said one direction; second interconnected means directing the operation of said positioning means to position said connection means effective both during the second and third stages of movement of the drive member during machine operation, whereby, as directed by the timing of the drive member second stage of movement, the totalizer is caused to be engaged with the actuators prior to return movement thereof from said one direction, and whereby, as directed by the timing of the drive member third stage of movement, the totalizer is caused to be disengaged from the actuators after return movement thereof from said one direction; third interconnected means directing the operation of said positioning means to position said connection means effective both during the first and third stages of movement of the drive member during machine operation, whereby, as directed by the timing of the drive member first stage of movement, the totalizer is caused to be engaged with the actuators prior to movement thereof in said one direction, and whereby, as directed by the timing of the drive member third stage of movement, the totalizer is caused to be disengaged from the actuators after return movement thereof from said one direction; and type-of-operation transaction means for calling into being one or the other of said first, second, and third interconnected means during each machine operation.

3. In an accounting machine having a totalizer and actuators for the totalizer, said actuators being regularly moved in one direction and returned therefrom during each machine operation, and said totalizer being selectively movable into and out of engagement with said actuators during each machine operation for performing precise amount entry and totalizer reading machine functions thereduring, the combination of a totalizer engagement drive member regularly operated through three stages of movement during each machine operation, the first stage of movement being performed prior to movement of said actuators in said one direction, the second stage of movement being performed after movement of said actuators in said one direction and before return movement of said actuators from said one direction, and the third stage of movement being performed after return movement of said actuators from said one direction; a first abutment on said drive member; a second abutment on said drive member; an engaging selection latch on said totalizer operable for moving said totalizer into engagement with said actuators during machine operation; said engaging selection latch being aligned for interconnection with said drive member first abutment; a disengaging selection latch on said totalizer operable for moving said totalizer out of engagement with said actuators during machine operation; said disengaging selection latch being aligned for interconnection with said drive member second abutment; means normally maintaining both said engaging and disengaging selection latches in abutment non-connecting positions; means operable throughout the staged movement of said drive member for selectively moving each of said engaging and disengaging selection latches into an abutment connecting position; the first operation of said moving means being effective for moving said engaging selection latch into a drive member first abutment connecting position and the second operation of said moving means being effective for moving said disengaging selection latch into a drive member second abutment connecting position; first machine function control means interconnected to said moving means and operable during machine operation for operating said moving means both prior to the performance of the drive member first stage of movement and prior to the performance of the drive member second stage of movement thereduring, whereby operation of said engaging selection latch by the drive member first abutment effects totalizer engagement with said actuators prior to movement thereof in said one direction and whereby operation of said disengaging selection latch by the drive member second abutment effects totalizer disengagement from said actuators after movement thereof in said one direction; second machine function control means interconnected to said moving means and operable during machine operation for operating said moving means prior to performance of the drive member second stage of movement thereduring, whereby operation of said engaging selection latch by the drive member first abutment effects totalizer engagement with said actuators prior to return movement thereof from said one direction; first transaction means for selecting said first machine function control means for operation during machine operation; second transaction means for selecting said second machine function control means for operation during machine operation; and means restricting operation of said moving means to that machine function control means first selected for operation through said first and second transaction means during each machine operation.

4. The combination of claim 3 including a third abutment on said drive member; and means for guiding said disengaging selection latch into a drive member third abutment connecting position whenever totalizer engagement with said actuators is effected during performance of the drive member second stage of movement during machine operation, whereby operation of said disengaging selection latch is automatically had during performance of the drive member third stage of movement for effecting totalizer disengagement from said actuators after return movement thereof from said one direction.

5. The combination of claim 3 including third machine function control means interconnected to said moving means and operable during machine operation for operating said moving means prior to performance of the drive member first stage of movement thereduring, whereby operation of said engaging selection latch by the drive member first abutment effects totalizer engagement with said actuators prior to movement thereof in said one direction; third transaction means for selecting said third machine function control means for operation during machine operation; further means restricting operation of said moving means to that machine function control means first selected for operation through said first, second, and third transaction means during each machine operation; a third abutment on said drive member; and means for guiding said disengaging selection latch into a drive member third abutment connecting position whenever totalizer engagement with said actuators is effected during machine operation, whereby, if not selectively operated during performance of the drive member second stage of movement, operation of said disengaging selecting latch is automatically had during performance of the drive member third stage of movement for effecting totalizer disengagement from said actuators after return movement thereof from said one direction.

6. In an accounting machine having a totalizer and actuators for the totalizer, said actuators being regularly moved in one direction and returned therefrom during each machine operation, and said totalizer being selectively movable into and out of engagement with said actuators during each machine operation for performing precise amount entry and totalizer reading machine functions thereduring, the combination of a totalizer engagement drive member regularly operated through three stages of movement during each machine operation, the first stage of movement being timed to engage the totalizer with the actuators prior to movement thereof in said one direction, the second stage of movement being timed both to disengage the totalizer from the actuators after movement thereof in said one direction and to engage the totalizer with the actuators prior to return movement thereof from said one direction, and the third stage of movement being timed to disengage the totalizer from the actuators after return movement thereof from said one direction; totalizer engagement selection means for interconnecting said totalizer and said drive member during machine operation; totalizer disengagement selection means for interconnecting said totalizer and said drive member during machine operation; each of said engagement and disengagement selection means being normally in a position ineffective for connecting said totalizer and said drive member but being movable to an effective, totalizer and drive member connecting position throughout the staged movement of said drive member; single operating means for moving each of said engagement and disengagement selection means from its ineffective to its effective position during machine operation; first type-of-operation control means interconnected to said single operating means for directing operation thereof during machine operation to move said totalizer engagement selection means to its effective position prior to commencement of the drive member first stage of movement and to move said totalizer disengagement selection means to its effective position prior to commencement of the drive member second stage of movement, whereby the totalizer is caused to be engaged with the actuators prior to movement thereof in said one direction and disengaged from the actuators after movement thereof in said one direction during machine operation; second type-of-operation control means interconnected to said single operating means for directing operation thereof during machine operation to move said totalizer engagement selection means to its effective position prior to commencement of the drive member second stage of movement and to move said totalizer disengagement selection means to its effective position prior to commencement of the drive member third stage of movement, whereby the totalizer is caused to be engaged with the actuators prior to return movement thereof from said one direction and disengaged from the actuators after return movement thereof from said one direction during machine operation; first type-of-operation transaction means operable prior to machine operation for calling into being said first type-of-operation control means during machine operation; second type-of-operation transaction means operable prior to machine operation for calling into being said second type-of-operation control means during machine operation; and means restricting totalizer engagement and disengagement to one or the other of said first and second type-of-operation control means during each machine operation.

7. In an accounting machine having a totalizer and actuators for the totalizer, said actuators being regularly moved in one direction and returned therefrom during each machine operation, and said totalizer being selectively movable into and out of engagement with said actuators during each machine operation for performing precise amount entry and totalizer reading machine functions thereduring, the combination of a totalizer engagement drive member regularly operated through three stages of movement during each machine operation, the first stage of movement being timed to engage the totalizer with the actuators prior to movement thereof in said one direction, the second stage of movement being timed both to disengage the totalizer from the actuators after movement thereof in said one direction and to engage the totalizer with the actuators prior to return movement thereof from said one direction, and the third stage of movement being timed to disengage the totalizer from the actuators after return movement thereof from said one direction; totalizer engagement selection means for interconnecting said totalizer and said drive member during machine operation; totalizer disengagement selection means for interconnecting said totalizer and said drive member during machine operation; each of said engagement and disengagement selection means being normally in a position ineffective for connecting said totalizer and said drive member but being movable to an effective, totalizer and drive member connecting position throughout the staged movement of said drive member; single operating means for moving each of said engagement and disengagement selection means from its ineffective to its effective position during machine operation; first type-of-operation control means interconnected to said single operating means for directing operation thereof during machine operation to move said totalizer engagement selection means to its effective position prior to commencement of the drive member first stage of movement and to move said totalizer disengagement selection means to its effective position prior to commencement of the drive member second stage of movement, whereby the totalizer is caused to be engaged with the actuators prior to movement thereof in said one direction and disengaged from the actuators after movement thereof in said one direction during machine operation; second type-of-operation control means interconnected to said single operating means for directing operation thereof during machine operation to move said totalizer engagement selection means to its effective position prior to commencement of the drive member second stage of movement and to move said totalizer disengagement selection means to its effective position prior to commencement of the drive member third stage of movement, whereby the totalizer is caused to be engaged with the actuators prior to return movement thereof from said one direction and disengaged from the actuators after return movement thereof from said one direction during machine operation; third type-of-operation control means interconnected to said single operating means for directing operation thereof during machine operation to move said totalizer engagement selection means to its effective position prior to commencement of the drive member first stage of movement and to move said totalizer disengagement selection means to its effective position prior to commencement of the drive member third stage of movement, whereby the totalizer is caused to be engaged with the actuators prior to movement thereof in said one direction and disengaged from the actuators after return movement thereof from said one direction during machine operation; first type-of-operation transaction means operable prior to machine operation for selecting said first type-of-operation control means for operation during machine operation; second type-of-operation transaction means operable prior to machine operation for selecting said second type-of-operation control means for operation during machine operation; third type-of-operation transaction means operable prior to machine operation for selecting said third type-of-operation control means for operation during machine operation; and means restricting totalizer engagement and disengagement to one or the other of said first, second, and third type-of-operation control means during each machine operation.

8. In an accounting machine having a totalizer and actuators for the totalizer, said actuators being regularly moved in one direction and returned therefrom during each machine operation, and said totalizer being selectively movable into and out of engagement with said actuators during each machine operation for performing precise amount entry and totalizer reading machine functions thereduring, the combination of a totalizer engagement drive member regularly operated through three stages of movement during each machine operation, the first stage of movement being timed to engage the totalizer with the actuators prior to movement thereof in said one direction, the second stage of movement being timed both to disengage the totalizer from the actuators after movement thereof in said one direction and to engage the totalizer with the actuators prior to return movement thereof from said one direction, and the third stage of movement being timed to disengage the totalizer from the actuators after return movement thereof from said one direction; a totalizer engagement actuating notch in said drive member; a totalizer first disengagement actuating notch in said drive member; an engaging selection latch carried by said totalizer and adapted for entry within said drive member carried totalizer engagement actuating notch; a disengaging selection latch carried by said totalizer and adapted for entry within said drive member carried totalizer first disengagement actuating notch; means continually urging each of said engaging and disengaging selection latches to a notch non-entering position; means operable throughout the staged movement of said drive member during each machine operation for overcoming said urging means and alternately moving said engaging and disengaging selection latches to notch entering positions; first control means interconnected to said moving means for overcoming said urging means and moving said totalizer engaging selection latch to a totalizer engagement actuating notch entering position prior to commencement of the drive member first stage of movement during machine operation, whereby the drive member during its first stage of movement becomes effective for completing totalizer engagement with the actuators prior to movement thereof in said one direction, and for overcoming said urging means and moving said totalizer disengaging selection latch to a totalizer first disengagement actuating notch entering position prior to commencement of the drive member second stage of movement during machine operation, whereby the drive member during its second stage of movement becomes effective for completing totalizer disengagement from the actuators after movement thereof in said one direction; second control means interconnected to said moving means for overcoming said urging means and moving said totalizer engaging selection latch to a totalizer engagement actuating notch entering position prior to commencement of the drive member second stage of movement during machine operation, whereby the drive member during its second stage of movement becomes effective for completing totalizer engagement with the actuators prior to return movement thereof from said one direction; a totalizer second disengagement actuating notch in said drive member; said totalizer disengaging selection latch being further adapted for entry within said drive member carried totalizer second disengagement actuating notch; means directing said totalizer disengaging selection latch to a totalizer second disengagement actuating notch entering position whenever totalizer engagement with said actuators is completed by the drive member second stage of movement during machine operation, whereby the drive member during its third stage of movement then becomes effective for completing totalizer disengagement from the actuators after return movement thereof from said one direction; first transaction means operable prior to machine operation for selecting said first control means for operation during machine operation; second transaction means operable prior to machine operation for selecting said second control means for operation during machine operation; and interlock means between said first and second control means permitting one or the other only thereof to be selected for operation during each machine operation through said first and second transaction means.

9. In an accounting machine having a totalizer and actuators for the totalizer, said actuators being regularly moved in one direction and returned therefrom during each machine operation, and said totalizer being selectively movable into and out of engagement with said actuators during each machine operation for performing precise amount entry and totalizer reading machine functions thereduring, the combination of a totalizer engagement drive member regularly operated through three stages of movement during each machine operation, the first stage of movement being timed to engage the totalizer with the actuators prior to movement thereof in said one direction, the second stage of movement being timed both to disengage the totalizer from the actuators after movement thereof in said one direction and to engage the totalizer with the actuators prior to return movement thereof from said one direction, and the third stage of movement being timed to disengage the totalizer from the actuators after return movement thereof from said one direction; a totalizer engagement actuating notch in said drive member; a totalizer first disengagement actuating notch in said drive member; a totalizer engaging selection latch carried by said totalizer and adapted for entry within said drive member carried totalizer engagement actuating notch; a totalizer disengaging selection latch carried by said totalizer and adapted for entry within said drive member carried totalizer first disengagement actuating notch; means normally urging each of said engaging and disengaging selection latches to a notch nonentering position; means operable throughout the staged movement of said drive member during each machine operation for overcoming said urging means and alternately moving said engaging and disengaging selection latches to notch entering positions; first control means interconnected to said moving means for overcoming said urging means and moving said totalizer engaging selection latch to an engagement actuating notch entering position prior to commencement of the drive member first stage of movement during machine operation, whereby the drive member during its first stage of movement becomes effective for completing totalizer engagement with the actuators prior to movement thereof in said one direction, and for overcoming said urging means and moving said totalizer disengaging selection latch to a first disengagement actuating notch entering position prior to commencement of the drive member second stage of movement during machine operation, whereby the drive member during its second stage of movement becomes effective for completing totalizer disengagement from the actuators after movement thereof in said one direction; second control means interconnected to said moving means for overcoming said urging means and moving said totalizer engaging selection latch to an engagement actuating notch entering position prior to commencement of the drive member second stage of movement during machine operation, whereby the drive member during its second stage of movement becomes effective for completing totalizer engagement with the actuators prior to return movement thereof from said one direction; third control means interconnected to said moving means for overcoming said urging means and moving said totalizer engaging selection latch to an engagement actuating notch entering position prior to commencement of the drive member first stage of movement during machine operation, whereby the drive member during its first stage of movement becomes effective for completing totalizer engagement with the actuators prior to movement thereof in said one direction; a totalizer second disengagement actuating notch in said drive member; means directing said totalizer disengaging selection latch to a second disengagement actuating notch entering position whenever totalizer engagement with said actuators is completed by one or the other of the drive member first and second stages of movement during machine operation, whereby the drive member during its third stage of movement then becomes effective for completing totalizer disengagement from the actuators after return movement thereof from said one direction if not completed prior thereto during machine operation; first transaction means operable prior to machine operation for selecting said first control means for operation during machine operation; second transaction means operable prior to machine operation for selecting said second control means for operation during machine operation; third transaction means operable prior to machine operation for selecting said third control means for operation during machine operation; and interlock means between said first, second, and third control means permitting one only thereof to be selected for operation during each machine operation through said first, second, and third transaction means.

References Cited in the file of this patent
UNITED STATES PATENTS

| | | |
|---|---|---|
| 2,396,188 | Mehan | Mar. 5, 1946 |
| 2,708,549 | Nelson | May 17, 1955 |
| 2,930,523 | Christian | Mar. 29, 1960 |